(12) United States Patent
Mizuno

(10) Patent No.: US 8,503,806 B2
(45) Date of Patent: *Aug. 6, 2013

(54) COMPRESSION ENCODER, COMPRESSION ENCODING METHOD AND PROGRAM

(75) Inventor: Yusuke Mizuno, Osaka (JP)

(73) Assignee: Megachips Corporation, Osaka-shi (JP)

( * ) Notice: Subject to any disclaimer, the term of this patent is extended or adjusted under 35 U.S.C. 154(b) by 1114 days.

This patent is subject to a terminal disclaimer.

(21) Appl. No.: 11/515,718

(22) Filed: Sep. 6, 2006

(65) Prior Publication Data

US 2007/0053620 A1    Mar. 8, 2007

(30) Foreign Application Priority Data

Sep. 6, 2005 (JP) ................................. 2005-257636

(51) Int. Cl.
*G06K 9/46* (2006.01)
(52) U.S. Cl.
USPC .......................................................... 382/240
(58) Field of Classification Search
USPC .......................................................... 382/240
See application file for complete search history.

(56) References Cited

U.S. PATENT DOCUMENTS

| 7,009,533 | B1* | 3/2006 | Wegener | 341/76 |
| 2005/0141773 | A1* | 6/2005 | Mizuno | 382/239 |
| 2005/0204109 | A1* | 9/2005 | Apostolopoulos et al. | 711/163 |
| 2005/0265613 | A1* | 12/2005 | Fukuhara et al. | 382/239 |

FOREIGN PATENT DOCUMENTS

JP    2001-45484    2/2001

OTHER PUBLICATIONS

U.S. Appl. No. 11/515,67, filed Sep. 6, 2006, Mizuno.

* cited by examiner

*Primary Examiner* — Nirav G Patel
(74) *Attorney, Agent, or Firm* — Oblon, Spivak, McClelland, Maier & Neustadt, L.L.P.

(57) ABSTRACT

A rate control unit performs data truncation on a code sequence having been sorted and bit shifted as shown in FIG. 10 so that a desired noise reduction effect is achieved. The data truncation occurs in sequence from the rightmost bit. For example, in FIG. 10, data is truncated from data of bit 0 in a subband VHL4 downwardly in sequence through data of bit 0 in a subband YHH5, and so on. If the desired noise reduction effect can be achieved by truncation of up to bit data in the subband YHH1, data in those subbands in a dotted area in FIG. 10 will be truncated. If the desired noise reduction effect cannot be achieved by truncation of up to bit data in the subband YHH1, data will then be truncated from data of bit 0 in a subband VLL4 downwardly in sequence.

17 Claims, 27 Drawing Sheets

Fig. 2

Table J-24 — Recommended frequency weighting

| level | Viewing distance 1000 | | | Viewing distance 2000 | | | Viewing distance 4000 | | |
|---|---|---|---|---|---|---|---|---|---|
| | HL | LH | HH | HL | LH | HH | HL | LH | HH |
| 5 | 1 | 1 | 1 | 1 | 1 | 1 | 1 | 1 | 1 |
| 4 | 1 | 1 | 1 | 1 | 1 | 1 | 1 | 1 | 0,731 668 |
| 3 | 1 | 1 | 1 | 1 | 1 | 0,727 203 | 0,564 344 | 0,564 344 | 0,285 968 |
| 2 | 1 | 1 | 0,727 172 | 0,560 841 | 0,560 841 | 0,284 193 | 0,179 609 | 0,179 609 | 0,043 903 |
| 1 | 0,560 805 | 0,560 805 | 0,284 173 | 0,178 494 | 0,178 494 | 0,043 631 | 0,014 774 | 0,014 774 | 0,000 573 |

Fig. 3

Table J-25  Recommended frequency weighting for multiple component (colour) images

| Comp | Lev | Viewing distance 1000 | | | Viewing distance 1700 | | | Viewing distance 3000 | | |
|---|---|---|---|---|---|---|---|---|---|---|
| | | HL | LH | HH | HL | LH | HH | HL | LH | HH |
| Y (Y0) | 5 | 1 | 1 | 1 | 1 | 1 | 1 | 1 | 1 | 1 |
| | 4 | 1 | 1 | 1 | 1 | 1 | 1 | 1 | 1 | 1 |
| | 3 | 1 | 1 | 1 | 1 | 1 | 1 | 0,921 045 | 0,921 045 | 0,848 324 |
| | 2 | 0,998 276 | 0,998 276 | 0,996 555 | 0,861 593 | 0,861 593 | 0,742 342 | 0,410 628 | 0,410 628 | 0,182 760 |
| | 1 | 0,756 353 | 0,756 353 | 0,573 057 | 0,307 191 | 0,307 191 | 0,108 920 | 0,038 487 | 0,038 487 | 0,003 075 |
| Cb (Y1) | 5 | 0,883 196 | 0,883 196 | 0,833 582 | 0,818 766 | 0,818 766 | 0,745 875 | 0,717 086 | 0,717 086 | 0,613 777 |
| | 4 | 0,793 487 | 0,793 487 | 0,712 295 | 0,689 404 | 0,689 404 | 0,579 220 | 0,539 437 | 0,539 437 | 0,403 353 |
| | 3 | 0,650 482 | 0,650 482 | 0,531 700 | 0,501 652 | 0,501 652 | 0,362 279 | 0,319 773 | 0,319 773 | 0,185 609 |
| | 2 | 0,450 739 | 0,450 739 | 0,309 177 | 0,280 068 | 0,280 068 | 0,152 290 | 0,124 021 | 0,124 021 | 0,044 711 |
| | 1 | 0,230 503 | 0,230 503 | 0,113 786 | 0,097 816 | 0,097 816 | 0,031 179 | 0,023 308 | 0,023 308 | 0,003 413 |

Fig. 4

Table J-25 — Recommended frequency weighting for multiple component (colour) images (continued)

| Comp | Lev | Viewing distance 1000 | | | Viewing distance 1700 | | | Viewing distance 3000 | | |
|---|---|---|---|---|---|---|---|---|---|---|
| | | HL | LH | HH | HL | LH | HH | HL | LH | HH |
| Cr (Y2) | 5 | 0,910 877 | 0,910 877 | 0,872 378 | 0,860 885 | 0,860 885 | 0,803 172 | 0,780 091 | 0,780 091 | 0,695 128 |
| | 4 | 0,841 032 | 0,841 032 | 0,776 180 | 0,757 626 | 0,757 626 | 0,665 951 | 0,631 632 | 0,631 632 | 0,509 729 |
| | 3 | 0,725 657 | 0,725 657 | 0,625 103 | 0,598 537 | 0,598 537 | 0,470 893 | 0,428 659 | 0,428 659 | 0,287 593 |
| | 2 | 0,552 901 | 0,552 901 | 0,418 938 | 0,388 492 | 0,388 492 | 0,248 566 | 0,211 871 | 0,211 871 | 0,100 658 |
| | 1 | 0,336 166 | 0,336 166 | 0,200 507 | 0,177 435 | 0,177 435 | 0,077 130 | 0,060 277 | 0,060 277 | 0,014 977 |

Fig. 22

COMPRESSION ENCODER, COMPRESSION ENCODING METHOD AND PROGRAM

BACKGROUND OF THE INVENTION

1. Field of the Invention

The present invention relates to a compression encoder and compression encoding method for use in image compression and expansion technology.

2. Description of the Background Art

As a next-generation high-efficiency coding standard for image data, the International Organization for Standardization (ISO) and the International Telecommunication Union-Telecommunication Standardization Sector (ITU-T) have been developing the Joint Photographic Experts Group 2000 (JPEG2000) standard. The JPEG2000 standard provides functions superior to the Joint Photographic Experts Group (JPEG) standard which is currently in the mainstream, and features the adoption of discrete wavelet transform (DWT) for orthogonal transformation and of a technique called "Embedded Block Coding with Optimized Truncation" (EBCOT) which performs bit-plane coding, for entropy coding.

FIG. 23 is a functional block diagram showing a general configuration of a compression encoder 100 for image compressing and coding based on the JPEG2000 standard. Hereinbelow, the procedure of compression and coding according to the JPEG2000 standard is generally described with reference to FIG. 23.

An image signal inputted to the compression encoder 100 is DC level shifted in a DC level shift unit 102 as needed, and outputted to a color-space conversion unit 103. The color-space conversion unit 103 converts the color space of a signal inputted from the DC level shift unit 102. For example, an RGB signal inputted to the color-space conversion unit 103 is converted into a YcbCr signal (a signal consisting of a luminance signal Y and color-difference signals Cb and Cr).

Then, a tiling unit 104 divides an image signal inputted from the color-space conversion unit 103 into a plurality of rectangular regional components called "tiles", and outputs those components to a DWT unit 105. The DWT unit 105 performs integer or real-number DWT on each tile of an image signal inputted from the tiling unit 104 and outputs resultant transform coefficients. In DWT, a one-dimensional (1-D) filter which divides a two-dimensional (2-D) image signal into high-pass (high-frequency) and low-pass (low-frequency) components, is applied in vertical and horizontal directions in this order. In the fundamentals of the JPEG2000 standard, an octave band splitting method is adopted in which only those bandpass components (subbands) which are divided into the low frequency side in both the vertical and horizontal directions are recursively divided into further subbands. The number of recursive divisions is called the decomposition level.

FIG. 24 is a schematic view showing a 2-D image 120 subjected to the DWT with the third decomposition level by the octave band splitting method. At the first decomposition level, the 2-D image 120 is divided into four subbands HH1, HL1, LH1 and LL1 (not shown) by sequential application of the aforementioned 1-D filter in the vertical and horizontal directions. Here, "H" and "L" stand for high- and low-pass components, respectively. For example, HL1 is the subband consisting of a horizontally high-pass component H and a vertically low-pass component L of the first decomposition level. To generalize the notation, "XYn" (X and Y are either H or L; n is an integer of 1 or more) represents a subband consisting of a horizontal component X and a vertical component Y of the n-th decomposition level.

At the second decomposition level, the low-pass component LL1 is divided into subbands HH2, HL2, LH2 and LL2 (not shown). Further, at the third decomposition level, the low-pass component LL2 is divided into further subbands HH3, HL3, LH3 and LL3. An arrangement of the resultant subbands HH1, HL1, LH1, HH2, HL2, LH2, HH3, HL3, LH3 and LL3 is shown in FIG. 24. While FIG. 24 shows an example of third-order decomposition, the JPEG2000 standard generally adopts approximately third- to eighth-order decomposition.

A quantization unit 106 has the function of performing scalar quantization on transform coefficients outputted from the DWT unit 105 as needed. The quantization unit 106 also has the function of performing a bit-shift operation in which higher priority is given to the image quality of a region of interest (ROI) which is specified by a ROI unit 107. Now, in reversible (lossless) transformation, scalar quantization is not performed in the quantization unit 106. The JPEG2000 standard provides two kinds of quantization means: the scalar quantization in the quantization unit 106 and post-quantization (truncation) which will be described later.

A representative method of utilizing ROI is the Max-shift method which is specified as an optional function of JPEG2000.

The Max-shift method is to arbitrarily specify a ROI and compress the ROI with high image quality while compressing a non-ROI with low image quality. More specifically, an original image is first subjected to wavelet transform to obtain distributions of wavelet coefficients, and a value Vm of the highest wavelet coefficient in a coefficient distribution corresponding to the non-ROI among the distributions of wavelet coefficients. Then, the number of bits "S" which satisfies S>=max (Vm) is obtained, to shift wavelet coefficients for only the ROI by S bits so as to be incremented. For instance, when the value Vm is "255" in decimal notation (i.e., "11111111" in binary notation), S is 8. When the value Vm is "128" in decimal notation (i.e., "10000000" in binary notation), S is also 8. Accordingly, in either case, the wavelet coefficients for the ROI are shifted by S=8 bits so as to be incremented. It is therefore possible to set the ROI to have a lower compression ratio than the non-ROI, allowing high-quality compressed data to be acquired for the ROI.

Then, transform coefficients outputted from the quantization unit 106 are, according to the aforementioned EBCOT, entropy coded on a block-by-block basis in a coefficient bit modeling unit 108 and an arithmetic coding unit 109, and are rate controlled in a rate control unit 110. More specifically, the coefficient bit modeling unit 108 divides each subband of input transform coefficients into regions called "code blocks" of, for example, approximately size 16×16, 32×32, or 64×64 and further decomposes each code block into a plurality of bit planes each constituting a two-dimensional array of respective one bits of the transform coefficients.

FIG. 25 is a schematic view showing the 2-D image 120 decomposed into a plurality of code blocks 121. FIG. 26 is a schematic view showing n bit planes $122_0$ through $122_{n-1}$ (n is a natural number) constituting these code blocks 121. As shown in FIG. 26, decomposition is performed such that, where a binary value 123 representing one transform coefficient in a code block 121 is "011 ... 0", then bits constituting this binary value 123 belong respectively to the bit planes $122_{n-1}$, $122_{n-2}$, $122_{n-3}$, ..., and $122_0$. In the figure, the bit plane $122_{n-1}$ represents the most-significant bit plane consisting only of the most-significant bits (MSB) of the transform coefficients, and the bit plane $122_0$ represents the least-significant bit plane consisting only of the least-significant bits (LSB) of the transform coefficients.

Then, the coefficient bit modeling unit 108 judges the context of each bit in each bit plane $122_k$ (k=0 to n−1), and as shown in FIG. 27, decomposes the bit plane $122_k$ according to the significance of each bit judgment result, into three types of coding passes: a significance propagation (SIG) pass, a magnitude refinement (MR) pass, and a cleanup (CL) pass. The context judgment algorithm for each coding pass is determined by the EBCOT. According to the algorithm, the state of being "significant" means that a coefficient concerned has already been found not to be zero in previous coding, and the state of being "not significant" means that the value of a coefficient concerned is or possibly zero.

The coefficient bit modeling unit 108 performs bit-plane coding with three types of coding passes: the SIG pass (coding pass for insignificant coefficients with significant neighbors), the MR pass (coding pass for significant coefficients), and the CL pass (coding pass for the remaining coefficients which belongs to neither the SIG nor MR pass). The bit-plane coding is performed, starting from the most-significant to the least-significant bit plane, by scanning each bit plane in four bits at a time and determining whether there exist significant coefficients. The number of bit planes consisting only of insignificant coefficients (0 bits) is recorded in a packet header, and actual coding starts from a bit plane where a significant coefficient first appears. The bit plane from which coding starts is coded in only the CL pass, and lower-order bit planes than that bit plane are sequentially coded in the above three types of coding passes.

FIG. 28 shows the rate-distortion (R-D) curve representing the relationship between rate (R) and distortion (D). In this R-D curve, $R_1$ represents the rate before bit-plane coding, $R_2$ the rate after bit-plane coding, $D_1$ the distortion before bit-plane coding, and $D_2$ the distortion after bit-plane coding. In the figure, A, B and C are labels representing the above coding passes. For efficient coding, as a route from the starting point $P_1$ ($R_1$, $D_1$) to the end point $P_2$ ($R_2$, $D_2$), the route A-B-C of a concave curve is more desirable than the route C-B-A of a convex curve. In order to achieve such a concave curve, it is known that coding should start from the MSB plane to the LSB plane.

Then, the arithmetic coding unit 109, using an MQ coder and according to the result of context judgment, performs arithmetic coding of a coefficient sequence provided from the coefficient bit modeling unit 108 on a coding-pass-by-coding-pass basis. This arithmetic coding unit 109 also has a mode of performing bypass processing in which a part of the coefficient sequence inputted from the coefficient bit modeling unit 108 is not arithmetically coded.

Then, the rate control unit 110 performs post-quantization for truncation of lower-order bit planes of a code sequence outputted from the arithmetic coding unit 109, thereby to control a final rate. A bit-stream generation unit 111 generates a bit stream by multiplexing a code sequence outputted from the rate control unit 110 and attached information (header information, layer structure, scalability information, quantization table, etc.) and outputs it as a compressed image.

The compression encoder with the aforementioned configuration adopts, as a method for compressing the amount of image data, for example a technique called rate-distortion (R-D) optimization utilizing the rate control method employed in the rate control unit 110 (cf. David S. Taubman and Michael W. Marcellin, "JPEG2000 Image Compression Fundamentals, Standards and Practice," Kluwer Academic Publishers, which is hereinafter referred to as the "first non-patent literature").

This method, however, arises problems of: (1) requiring calculating the amount of distortion for each rate in each coding pass, and the optimal solution for a certain coding rate has to be estimated, resulting in a great number of operations and low immediacy; and (2) requiring providing a memory for storing the amount of distortion calculated in each coding pass.

Particularly for quantization and rate control which directly affects performance characteristics of a compression encoder, there is a demand for a method for achieving efficient processing at high speeds while maintaining high image quality.

According to a conventional technique, when a beautiful skin effect is desired to be obtained in portrait capturing, for example, a noise removing filter (beautiful skin filter) is provided in a previous stage of a compression encoder to perform noise reduction on a captured image by the noise removing filter and then image compression by the compression encoder. This technique, however, arises problems in that: (1) although noise is removed by noise reduction, a new distortion occurs resulting from image compression following noise reduction; and (2) the two-stage configuration of the noise removing filter and compression encoder makes processing complicated.

SUMMARY OF THE INVENTION

An object of the present invention is to compress and code image data at high speeds with minimal operations. Another object of the invention is to obtain a compressed image that meets target image quality while reducing noise.

According to a first aspect of the present invention, a compression encoder for compression and coding of an image signal comprises a wavelet transformer for recursively dividing an image signal into high- and low-pass components by wavelet transform and generating and outputting transform coefficients in a plurality of bandpass components, an image-quality controller for determining a quantization step size by dividing a quantization parameter which indicates target image quality by a norm of a filter coefficient, an entropy coder for entropy coding the transform coefficients, and a rate controller for performing rate control by sorting coded data outputted from the entropy coder in predetermined order of scanning with the quantization step size to generate a code sequence and truncating part of the code sequence so that a total capacity of the coded data in the code sequence meets target image quality.

This achieves a noise reduction effect on the whole screen with minimal operations while controlling a data compression ratio in quantization according to target image quality.

According to a second aspect of the invention, a compression encoder for compression and coding of an image signal comprises a wavelet transformer for recursively dividing an image signal into high- and low-pass components by wavelet transform and generating and outputting transform coefficients in a plurality of bandpass components, an image-quality controller for determining a quantization step size by dividing a quantization parameter which indicates target image quality by a norm of a filter coefficient, a region-of-interest setting unit for setting at least one region of interest in the image signal, a quantizer for quantizing and sorting the transform coefficients with the quantization step size and sorting and bit shifting the transform coefficients on the basis of information on setting the at least one region of interest, an entropy coder for entropy coding the transform coefficients inputted from the quantizer, and a rate controller for performing rate control by truncating part of coded data outputted from the entropy coder so that a total capacity of the coded data meets target image quality.

This allows a compressed image to be readily generated that meets target image quality with the noise reduction effect on a region of interest.

According to a third aspect of the invention, a compression encoder for compression and coding of an image signal comprises a wavelet transformer for recursively dividing the image signal into high- and low-pass components by wavelet transform, and generating and outputting transform coefficients in a plurality of bandpass components, a region-of-interest setting unit for setting at least one region of interest in the image signal, a quantizer for quantizing the transform coefficients, an entropy coder for entropy coding the transform coefficients inputted from the quantizer, and a rate controller for performing rate control by sorting and bit shifting coded data outputted from the entropy coder on the basis of information on setting the at least one region of interest to generate a code sequence and then by truncating part of the code sequence so that a total capacity of the coded data meets target image quality.

This allows a compressed image to be readily generated that meets target image quality with the noise reduction effect on a region of interest. Further, processing can be achieved by a compression encoder not provided with the Max-shift method which is specified as an optional function of JPEG2000.

According to a fourth aspect of the invention, the compression encoder of the third aspect of the invention further comprises an image-quality controller for determining a quantization step size by dividing a quantization parameter which indicates target image quality by a norm of a filter coefficient. The quantizer quantizes the transform coefficients with the quantization step size, and the rate controller sorts the coded data with the quantization step size.

This achieves high speed quantization with minimal operations as compared with conventional techniques which require processes for estimating an optimal solution while controlling a data compression ratio in quantization according to target image quality.

According to a fifth aspect of the invention, in the compression encoder of any one of the second to fourth aspects of the invention, the at least one region of interest includes a plurality of regions of interest. The region-of-interest setting unit assigns a priority to each of the plurality of regions of interest specified. The amount of shift in the bit shifting on the basis of the information on setting the plurality of regions of interest is determined by the priority.

Each of the plurality of regions of interest is assigned a priority to generate a compressed image that meets target image quality while maintaining image quality of a desired region.

According to a sixth aspect of the invention, in the compression encoder of any one of the first to fifth aspects of the invention, the rate controller determines a target to be truncated in the rate control on a bit-plane-by-bit-plane basis.

This achieves minute and efficient rate control on a bit-plane-by-bit-plane basis according to target image quality.

According to a seventh aspect of the invention, in the compression encoder of any one of the first to fifth aspects of the invention, the rate controller determines a target to be truncated in the rate control on a pass-by-pass basis.

This achieves minute and efficient rate control on a pass-by-pass basis according to target image quality.

According to an eighth aspect of the invention, in the compression encoder of any one of the first, second and fourth to seventh aspects of the invention, the image-quality controller determines the quantization step size applying weighting in consideration of human visual characteristics by dividing the quantization parameter by a value obtained by multiplying a norm of a filter coefficient by an energy weighting factor which is a predetermined value determined based on the human visual characteristics.

This allows a compressed image to be readily generated with high display image quality in consideration of the human visual characteristics.

According to a ninth aspect of the invention, in the compression encoder of any one of the first, second and fourth to eighth aspects of the invention, the image-quality controller, when the quantization step size is less than a predetermined value, multiplies the quantization step size by powers of 2 so that the quantization step size is not less than the predetermined value.

This readily achieves a device for performing quantization efficiently according to target image quality.

According to a tenth aspect of the invention, in the compression encoder of the ninth aspect of the invention, the rate controller, when the quantization step size is a value obtained by multiplication by powers of 2 in the image-quality controller, bit shifts the transform coefficients of the coded data, by the number of bits corresponding to an exponent of the powers of 2 in performing sorting with the quantization step size.

This allows a compressed image to be generated efficiently while maintaining image quality that meets target image quality.

According to an eleventh aspect of the invention, in the compression encoder of the first aspect of the invention, the rate controller is capable of changing a viewing distance, and the code sequence is bit shifted in accordance with change in viewing distance.

This allows control of an image coded with a quantization value for compression so that target image quality with the noise reduction effect is achieved.

According to a twelfth aspect of the invention, in the compression encoder of the second aspect of the invention, the quantizer is capable of changing a viewing distance, and the transform coefficients are further bit shifted in accordance with change in viewing distance.

This allows control of an image coded with a quantization value for compression so that target image quality with the noise reduction effect is achieved.

According to a thirteenth aspect of the invention, in the compression encoder of the third aspect of the invention, the rate controller is capable of changing a viewing distance, and the code sequence is further bit shifted in accordance with change in viewing distance.

This allows control of an image coded with a quantization value for compression so that target image quality with the noise reduction effect is achieved.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 2 to 4 give numerical tables of energy weighting factors;

FIG. 22 shows sorting and bit shifting of a code sequence according to a fourth preferred embodiment of the invention;

DESCRIPTION OF THE PREFERRED EMBODIMENTS

First Preferred Embodiment
Compression Encoder

Figure 1:
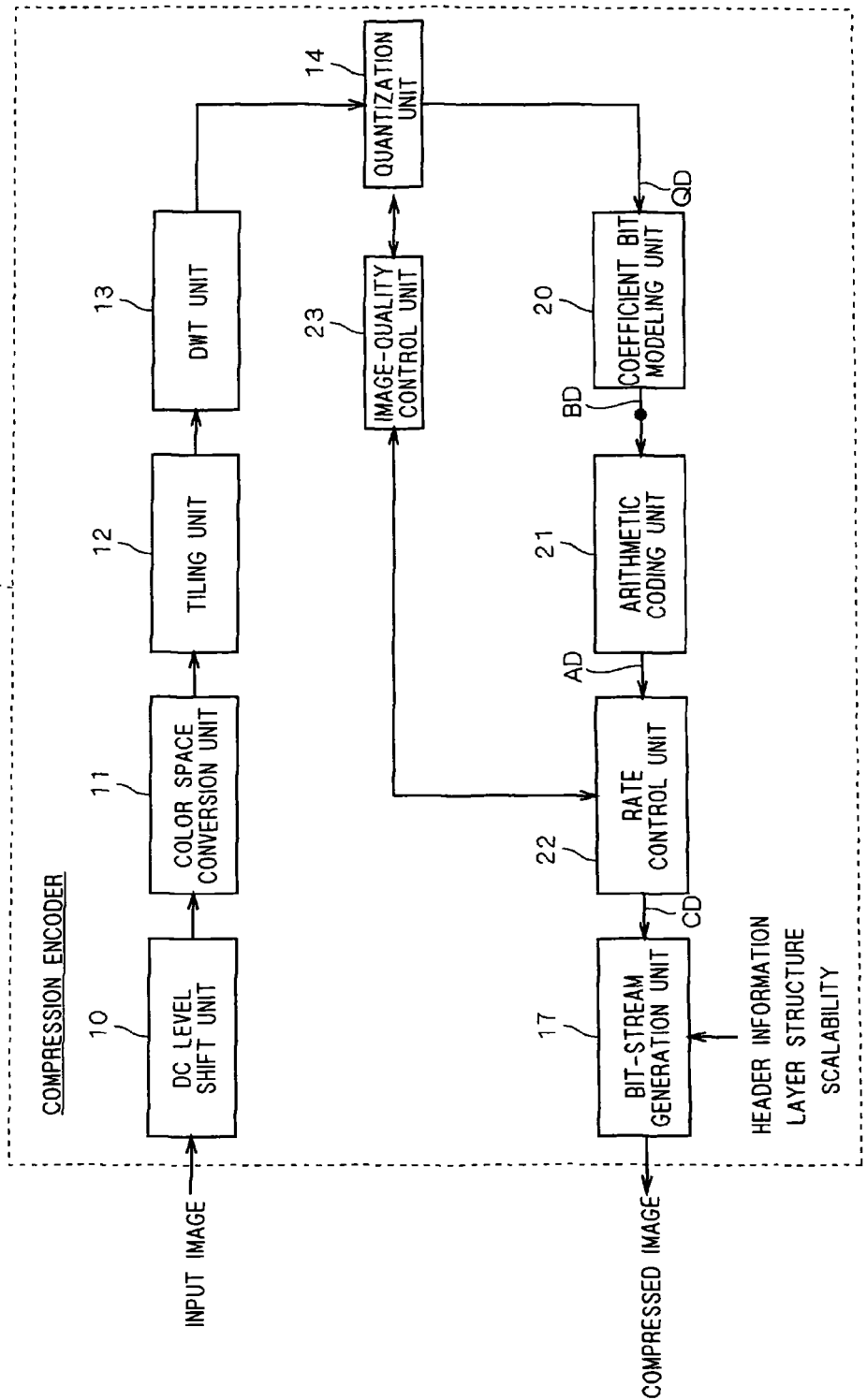
FIG. 1 shows a general configuration of a compression encoder according to a first preferred embodiment of the present invention.

FIG. 1 is a functional block diagram showing a general configuration of a compression encoder 1 according to a first preferred embodiment of the present invention. After general description of the configuration and function of this compression encoder 1, quantization and coding techniques according to this preferred embodiment will be described in detail.

The compression encoder 1 comprises a DC level shift unit 10, a color-space conversion unit 11, a tiling unit 12, a DWT unit 13, a quantization unit 14, a coefficient bit modeling unit 20, an arithmetic coding (entropy coding) unit 21, a rate control unit 22, an image-quality control unit 23 and a bit-stream generation unit 17.

All or parts of the units 10 to 14, 17 and 20 to 23 in the compression encoder 1 may consist of hardware or programs that run on a microprocessor. This program may be stored in a computer-readable recording medium.

An image signal inputted to the compression encoder 1 is DC level shifted in the DC level shift unit 10 as needed, and outputted to the color-space conversion unit 11. The color-space conversion unit 11 converts and outputs the color space of an input signal. The JPEG2000 standard provides reversible component transformation (RCT) and irreversible component transformation (ICT) for color-space conversion, either of which can be selected as necessary. Thus, for example, an input RGB signal is converted into a YcbCr or YUV signal.

Then, the tiling unit 12 divides the image signal inputted from the color-space conversion unit 11 into a plurality of rectangular regional components called "tiles" and outputs those components to the DWT unit 13. Here, the image signal is not always necessarily divided into tiles, and instead a single frame of image signal may be outputted as-is to the next functional block.

Figure 24:
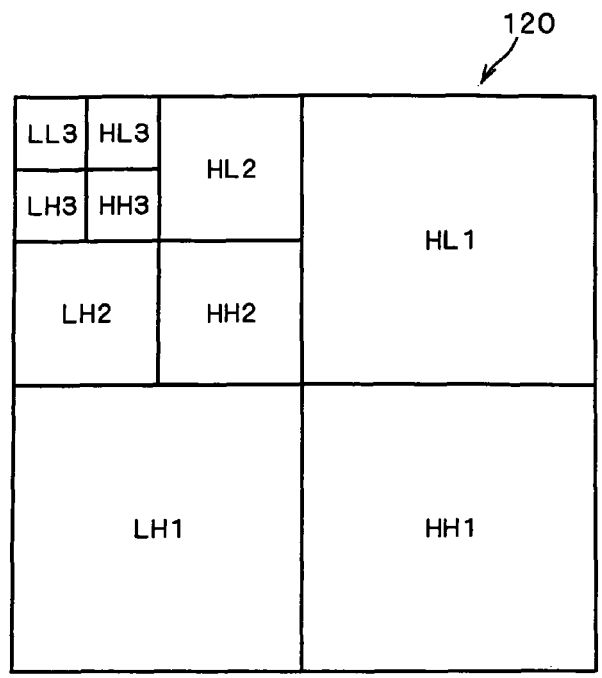
FIG. 24 is a schematic view showing a two-dimensional (2-D) image divided into subbands according to an octave band splitting method.
Figure 25:
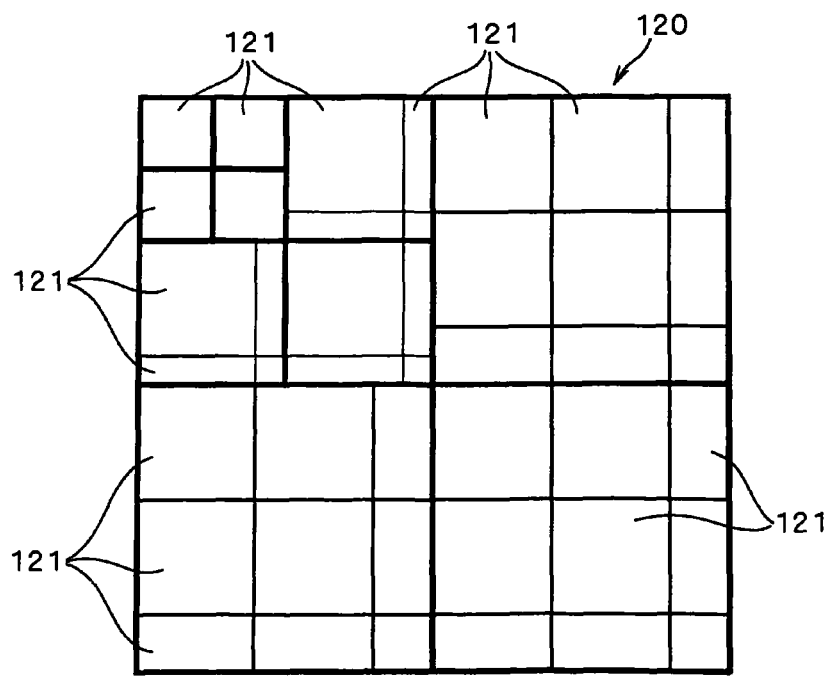
FIG. 25 is a schematic view showing a 2-D image decomposed into a plurality of code blocks.

Then, the DWT unit 13 performs integer or real-number DWT on each tile of the image signal inputted from the tiling unit 12, thereby to recursively divide the image signal into high- and low-pass components according to the aforementioned octave band splitting method. As a result, transform coefficients in a plurality of bandpass components (subbands) HH1 to LL3 as shown in FIG. 24 are generated and outputted to the quantization unit 14. More specifically, the real-number DWT uses a 9/7-, 5/3-, or 7/5-tap filter, and the integer DWT uses a 5/3- or 13/7-tap filter. Such filtering may be implemented through a convolution operation or by a lifting scheme which is more efficient than the convolution operation.

The quantization unit 14 has the function of performing scalar quantization on transform coefficients inputted from the DWT unit 13 according to quantization parameters which are determined by the image-quality control unit 23. The quantization unit 14 also has the function of performing a predetermined bit-shift operation. The method of performing quantization and bit-shift operation in the quantization unit 14 will be described later in detail.

Then, transform coefficients QD outputted from the quantization unit 14 are entropy coded on a block-by-block basis in the coefficient bit modeling unit 20 and the arithmetic coding unit 21, and they are rate controlled in the rate control unit 22.

Figure 23:
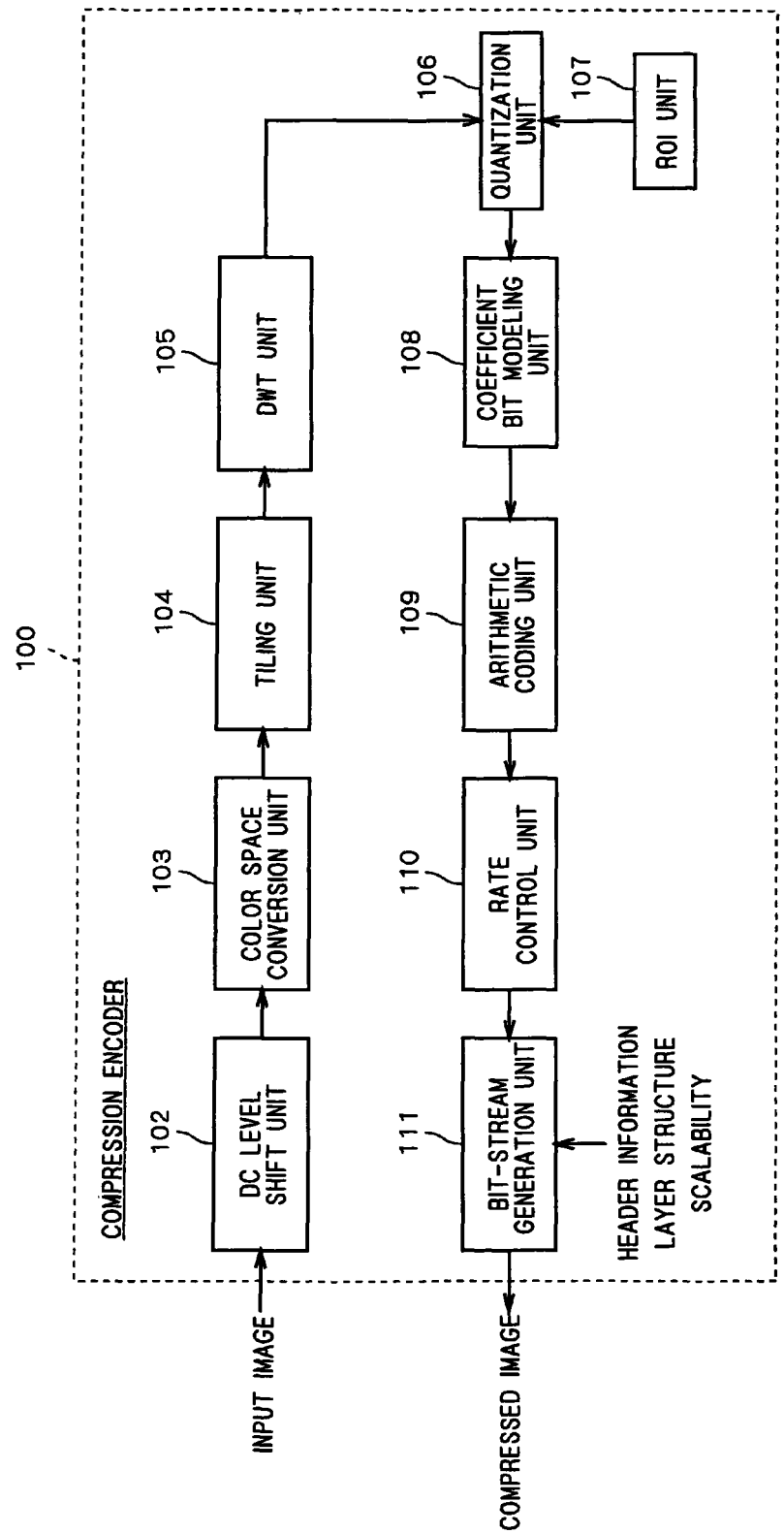
FIG. 23 shows a general configuration of a compression encoder according to the JPEG2000 standard.
Figure 26:
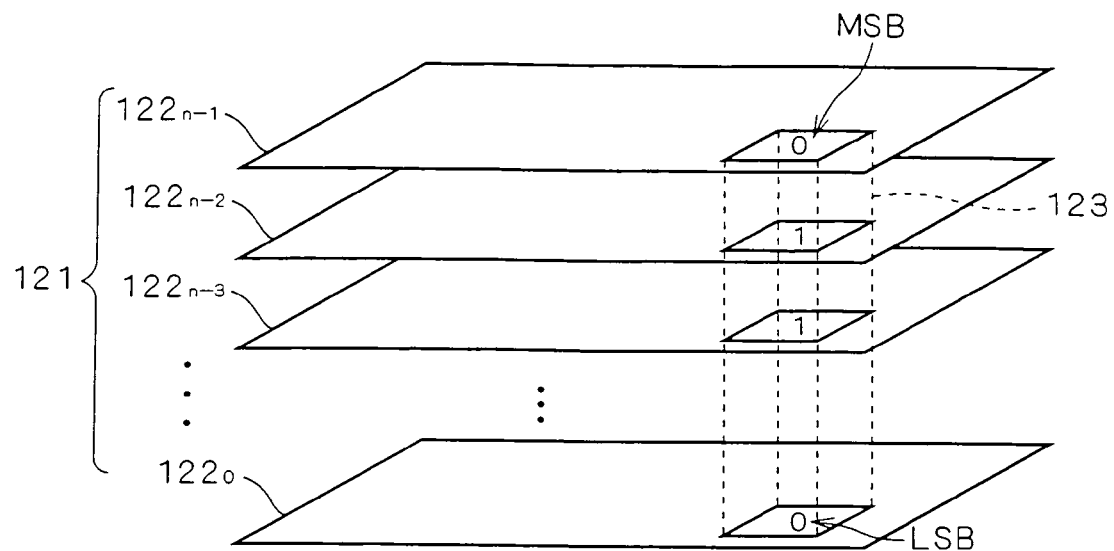
FIG. 26 is a schematic view showing a plurality of bit planes constituting a code block.

The coefficient bit modeling unit 20, like the coefficient bit modeling unit 108 shown in FIG. 23, divides each subband of input transform coefficients QD into code blocks of approximately size 32×32 or 64×64 and further decomposes each code block into a plurality of bit planes each constituting a 2-D array of bits. As a result, each code block is decomposed into a plurality of bit planes $122_0$ through $122_{n-1}$ as shown in FIG. 26.

The arithmetic coding unit 21 performs arithmetic coding on coded data BD inputted from the coefficient bit modeling unit 20 and outputs resultant coded data AD to the rate control unit 22. The arithmetic coding unit 21 sometimes performs bypass processing in which part of data to be coded is not arithmetically coded but instead is outputted as-is as part of the coded data AD. While this preferred embodiment adopts the arithmetic coding, the present invention is not limited to this only and may adopt other techniques for entropy coding.

The rate control unit 22 has the function of controlling the rate of the coded data AD inputted from the arithmetic coding unit 21 according to instructions from the image-quality control unit 23. That is, the rate control unit 22 has the function of performing post-quantization in which the coded data AD is sequentially truncated in ascending order of priority on a subband-by-subband, bit-plane-by-bit-plane, or coding-pass-by-coding-pass basis in order to achieve a desired noise reduction effect (beautiful skin effect in portrait capturing) on the whole screen considering a target rate (final rate of a compressed image).

The bit-stream generation unit 17 generates a bit stream by multiplexing coded data CD outputted from the rate control unit 22 and attached information (header information, layer structure, scalability, quantization table, etc.) and outputs it to the outside as a compressed image.

Quantization

Next, processing details of quantization achieved by the image-quality control unit 23 and quantization unit 14 shown in FIG. 1 are described.

The image-quality control unit 23 has the function of determining a quantization step size $\Delta_b$ for use in quantizing transform coefficients inputted from the DWT unit 13 in the quantization unit 14 on the basis of target quality information (high quality, standard quality, low quality, resolution information, etc.) which is provided from the outside. Hereinbelow, a method of determining the quantization step size $\Delta_b$ is described.

When an original image is divided by the DWT unit 13 into subbands (bandpass components) "XYn" (X and Y are either a high- or low-pass component H or L; n is the decomposition level) as shown in FIG. 24, the quantization step size $\Delta_b$ for use in quantization of each subband is given by the following equation (1):

$$\Delta_b = Q_P / Q_b \quad (1)$$

where $Q_P$ is a positive value inputted according to the target quality information, i.e., a quantization parameter; the higher the image quality, the smaller the input value. The quantization parameter $Q_P$ may be specified by direct input of a numerical value from the user or, for example, a predetermined table may be provided which associates a predetermined keyword indicating target quality information such as high quality, standard quality, and low quality with each numerical value of the quantization parameter $Q_P$, and then, the value of the quantization parameter $Q_P$ may be read out from that table by the user specifying desired image quality of compressed image data by that keyword.

Further, $Q_b$ is the quantized coefficient in each subband and expressed as a norm of a synthesis filter coefficient by the following equation (2):

$$Q_b = \sqrt{G_b} \quad (2)$$

Here, the weighting factor $G_b$ for subband b is calculated from the following equation (3):

$$G_b = \|S_b\|^2, \text{ where } S_b = s_b[n] \quad (3)$$

In the above equation (3), $s_b[n]$ is the one-dimensional (1-D) synthesis filter coefficient for subband b, and $\|x\|$ is the norm of the vector x.

According to the equations (4.39) and (4.40) given in the foregoing first non-patent literature, a 1-D synthesis filter coefficient $S_{L[1]}[n]$ for the low-pass component L1 of the first decomposition level and a 1-D synthesis filter coefficient $S_{H[1]}[n]$ for the high-pass component H1 of the same decomposition level are calculated from the following equations (4):

$$\begin{cases} S_{L[1]}[n] = g_0[n] \\ S_{H[1]}[n] = g_1[n] \end{cases} \quad (4)$$

In the above equations (4), $g_0[n]$ and $g_1[n]$ are respectively low- and high-pass coefficients for a forward transform filter used in band splitting of image signals.

A 1-D synthesis filter coefficient $S_{L[d]}[n]$ for the low-pass component Ld of the d-th decomposition level (d=1, 2, ..., D) and a 1-D synthesis filter coefficient $S_{H[d]}[n]$ for the high-pass component Hd of the same decomposition level are calculated from the following equations (5):

$$\begin{cases} S_{L[d]}[n] = \sum_k S_{L[d-1]}[k] g_0[n-2k] \\ S_{H[d]}[n] = \sum_k S_{H[d-1]}[k] g_0[n-2k] \end{cases} \quad (5)$$

Then, the squared norm of the 1-D synthesis filter coefficient for the low-pass component Ld of the d-th decomposition level is calculated from the following equation (6):

$$G_{L[d]} = \|S_{L[d]}[n]\|^2 = \sum_j |S_{L[d]}[j]|^2 \quad (6)$$

Also, the squared norm of the 1-D synthesis filter coefficient for the high-pass component Hd can be calculated from a similar equation to the equation (6).

TABLE 1 gives the calculation results of the squared norms of 1-D synthesis filter coefficients. In the table, n is the decomposition level; for example, $GL_1$ shows the calculation result for the low-pass component L of the first decomposition level.

TABLE 1

Squared norms of 1D synthesis filter coefficients

| Decomposition Level | $G_{Ln}$ | $G_{Hn}$ |
|---|---|---|
| 1 | 1.96591 | 0.52022 |
| 2 | 4.12241 | 0.96722 |
| 3 | 8.41674 | 2.07926 |
| 4 | 16.93557 | 4.30048 |
| 5 | 33.92493 | 8.68672 |
| 6 | 67.87717 | 17.41884 |
| 7 | 135.76805 | 34.86078 |
| 8 | 271.54296 | 69.73317 |
| 9 | 543.08936 | 139.47215 |
| 10 | 1086.18043 | 278.94721 |
| 11 | 2172.36172 | 557.89587 |

Two-dimensional (2-D) synthesis filter coefficients for subbands LLD, HLd, LHd, HHd of the d-th decomposition level (d=1, 2, ..., D; D is an integer value) can be expressed by the product of the above 1-D synthesis filter coefficients, and a 2-D weighting factor $G_b$ for subband b can be expressed by the product of the 1-D weighting factors. More specifically, the 2-D synthesis filter coefficients and the 2-D weighting factors can be calculated from the following equations (7):

$$\begin{cases} S_{LL[D]}[n_1, n_2] = S_{L[D]}[n_1] S_{L[D]}[n_2] \Rightarrow G_{LL[D]} = G_{L[D]} \cdot G_{L[D]} \\ S_{HL[d]}[n_1, n_2] = S_{L[d]}[n_1] S_{H[d]}[n_2] \Rightarrow G_{HL[d]} = G_{L[d]} \cdot G_{H[d]} \\ S_{LH[d]}[n_1, n_2] = S_{H[d]}[n_1] S_{L[d]}[n_2] \Rightarrow G_{LH[d]} = G_{H[d]} \cdot G_{L[d]} \\ S_{HH[d]}[n_1, n_2] = S_{H[d]}[n_1] S_{H[d]}[n_2] \Rightarrow G_{HH[d]} = G_{H[d]} \cdot G_{H[d]} \end{cases} \quad (7)$$

In the above equations (7), the subscripts LL[D], HL[d], LH[d], and HH[d] stand for the subbands LLD, HLd, LHd, and HHd, respectively.

The square root of the weighting factor $G_b$ is the norm. TABLEs 2 and 3 below give the calculation results of the 2-D weighting factors $G_b$ obtained from TABLE 1. TABLE 2 gives the numerical values of the squared norms of each subband for the 9/7 filter (9/7-tap filter), and TABLE 3 gives the numerical values of the norms corresponding to TABLE 2.

TABLE 2

(Squared norms of) weighting coefficients G for distortion model for 9/7 filter

| Decomposition Level | LL | HL | LH | HH |
|---|---|---|---|---|
| 1 | 3.86479 | 1.02270 | 1.02270 | 0.27063 |
| 2 | 16.99426 | 3.98726 | 3.98726 | 0.93551 |
| 3 | 70.84158 | 17.50056 | 17.50056 | 4.32330 |
| 4 | 286.81360 | 72.83113 | 72.83113 | 18.49415 |
| 5 | 1150.90066 | 294.69647 | 294.69647 | 75.45917 |
| 6 | 4607.30956 | 1182.34209 | 1182.34209 | 303.41630 |
| 7 | 18432.96262 | 4732.98083 | 4732.98083 | 1215.27440 |
| 8 | 73735.57967 | 18935.55202 | 18935.55202 | 4862.71528 |
| 9 | 294946.04918 | 75745.84127 | 75745.84127 | 19452.48118 |
| 10 | 1179787.92756 | 302986.99951 | 302986.99951 | 77811.54539 |
| 11 | 4719155.44117 | 1211951.63280 | 1211951.63280 | 311247.80240 |

TABLE 3

Norms of 9/7 filter

| Decomposition Level | LL | HL | LH | HH |
|---|---|---|---|---|
| 1 | 1.96591 | 1.01129 | 1.01129 | 0.52022 |
| 2 | 4.12241 | 1.99681 | 1.99681 | 0.96722 |
| 3 | 8.41674 | 4.18337 | 4.18337 | 2.07926 |
| 4 | 16.93557 | 8.53412 | 8.53412 | 4.30048 |
| 5 | 33.92493 | 17.16673 | 17.16673 | 8.68672 |
| 6 | 67.87717 | 34.38520 | 34.38520 | 17.41885 |
| 7 | 135.76805 | 68.79666 | 68.79666 | 34.86079 |
| 8 | 271.54296 | 137.60651 | 137.60651 | 69.73317 |
| 9 | 543.08936 | 275.21962 | 275.21962 | 139.47215 |
| 10 | 1086.18043 | 550.44255 | 550.44255 | 278.94721 |
| 11 | 2172.36172 | 1100.88675 | 1100.88675 | 557.89587 |

For example, let the quantization parameter $Q_P=16$ for all of the luminance signal Y and the color difference signals U and V. Then, the quantization step sizes $\Delta_b$ for the luminance signal Y and the color difference signals U and V are obtained from the values given in TABLE 3 using the above equations (1) and (2), which are as shown in TABLE 4.

TABLE 4

Quantization step sizes $\Delta_b$

| Decomposition Level | LL | HL | LH | HH |
|---|---|---|---|---|
| 1 | X | 15.82143 | 15.82143 | 30.75634 |
| 2 | X | 8.01277 | 8.01277 | 16.54233 |
| 3 | X | 3.82467 | 3.82467 | 7.69506 |
| 4 | X | 1.87483 | 1.87483 | 3.72051 |
| 5 | 0.47163 | 0.93204 | 0.93204 | 1.84189 |

The quantization parameter $Q_P$ used in obtaining the quantization step size $\Delta_b$ for each of the luminance signal Y and the color difference signals U and V is not necessarily the same value, and different values may be used according to the contents of image data. For example, for enhancement of color components, the quantization parameter $Q_P$ used for the color difference signals U and V may be smaller than that used for the luminance signal Y. In this way, an appropriate quantization parameter $Q_P$ for each signal may be used in consideration of the contents of image data, and the like.

The image-quality control unit 23 obtains the quantization step size $\Delta_b$ in this way and gives it to the quantization unit 14. Then, the quantization unit 14 performs quantization with the given quantization step size $\Delta_b$ for each subband.

However, if the value of the quantization step size $\Delta_b$ is less than 1, it is multiplied by powers of 2 to obtain a value of 1 or more before quantization. For example, although the quantization step size $\Delta_b$ for the subband LL5 calculated by the aforementioned method is 0.47163, for actual quantization of image data, it is multiplied by $2^2$ to obtain the value of 1.88652. Similarly, the quantization step size $\Delta_b$ of 0.93204 for the subband HL5 is multiplied by 2 to obtain the value of 1.86408 for quantization. In this way, the function of converting the quantization step size $\Delta_b$ into a predetermined numerical value depending on the performance of a quantizer for use in quantization simplifies the structure of a quantizer as well as achieves data compression that is the intended purpose of quantization. It should be noted here that making the quantization step size $\Delta_b$ a value of 1 or more is only one example. Thus, depending on the performance of a quantizer, for example if a quantizer uses the value of ½ or more, the quantization step size $\Delta_b$ should be converted into a value of ½ or more. That is, if the lower limit value handled by a quantizer is $½^m$, every quantization step size should be multiplied by powers of 2 to obtain a value of $½^m$ or more before quantization.

Instead of the aforementioned method, the image-quality control unit 23 can also determine the quantization step size $\Delta_b$ in consideration of human visual characteristics. This method is described hereinbelow.

The foregoing first non-patent literature describes in chapter 16 the weighted mean squared error (WMSE) based on the contrast sensitivity function (CSF) of the human visual system. Using this for improvement in human visual evaluation of image data after compression and coding, the above equation (2) is rewritten as the following equation (8):

$$Q_b = \sqrt{W_{b[i]}^{csf} G_{b[i]}} \quad (8)$$

where $W_{b[i]}^{csf}$ is called the "energy weighting factor" for subband b[i], the recommended numerical value of which is described in "INTERNATIONAL STANDARD ISO/IEC 15444-1ITU-T RECOMMENDATION T.800 Information technology—JPEG 2000 image coding system: Core coding system" (which is hereinafter referred to as the "second non-patent literature"). FIGS. 2 through 4 show the numerical values of the "energy weighting factors" described in the second non-patent literature.

In FIGS. 2 through 4, "level" and "Lev" stand for the decomposition level, and "Comp" stands for the luminance component Y and the color difference components Cb and Cr. Examples are shown for viewing distances of 1000, 1700, 2000, 3000, and 4000. The "Viewing distance of 1000", "Viewing distance of 1700", "Viewing distance of 2000", "Viewing distance of 3000", and "Viewing distance of 4000", respectively, represent viewing distances when displays or prints of 100 dpi, 170 dpi, 200 dpi, 300 dpi, and 400 dpi are viewed from 10 inches away.

For example, in the case of color image data, a specific method for obtaining the quantization step size $\Delta_b$ is described hereinbelow. Here, the color space of input color image consisting of RGB signals shall be converted by the color-space conversion unit 11 into YUV 422 or 420 color-space data.

Figure 5:
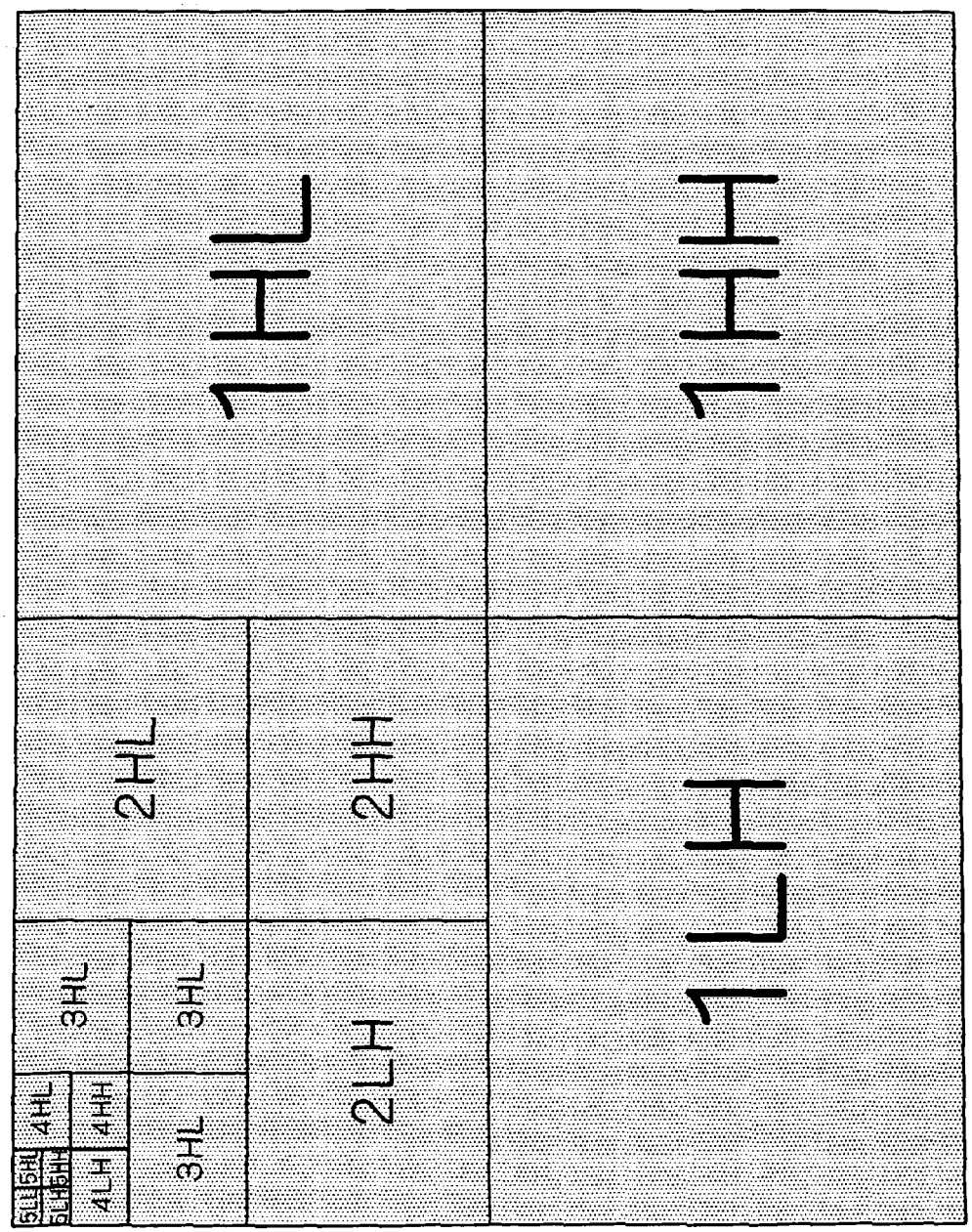
FIG. 5 shows a wavelet plane of a luminance signal.
Figure 6:
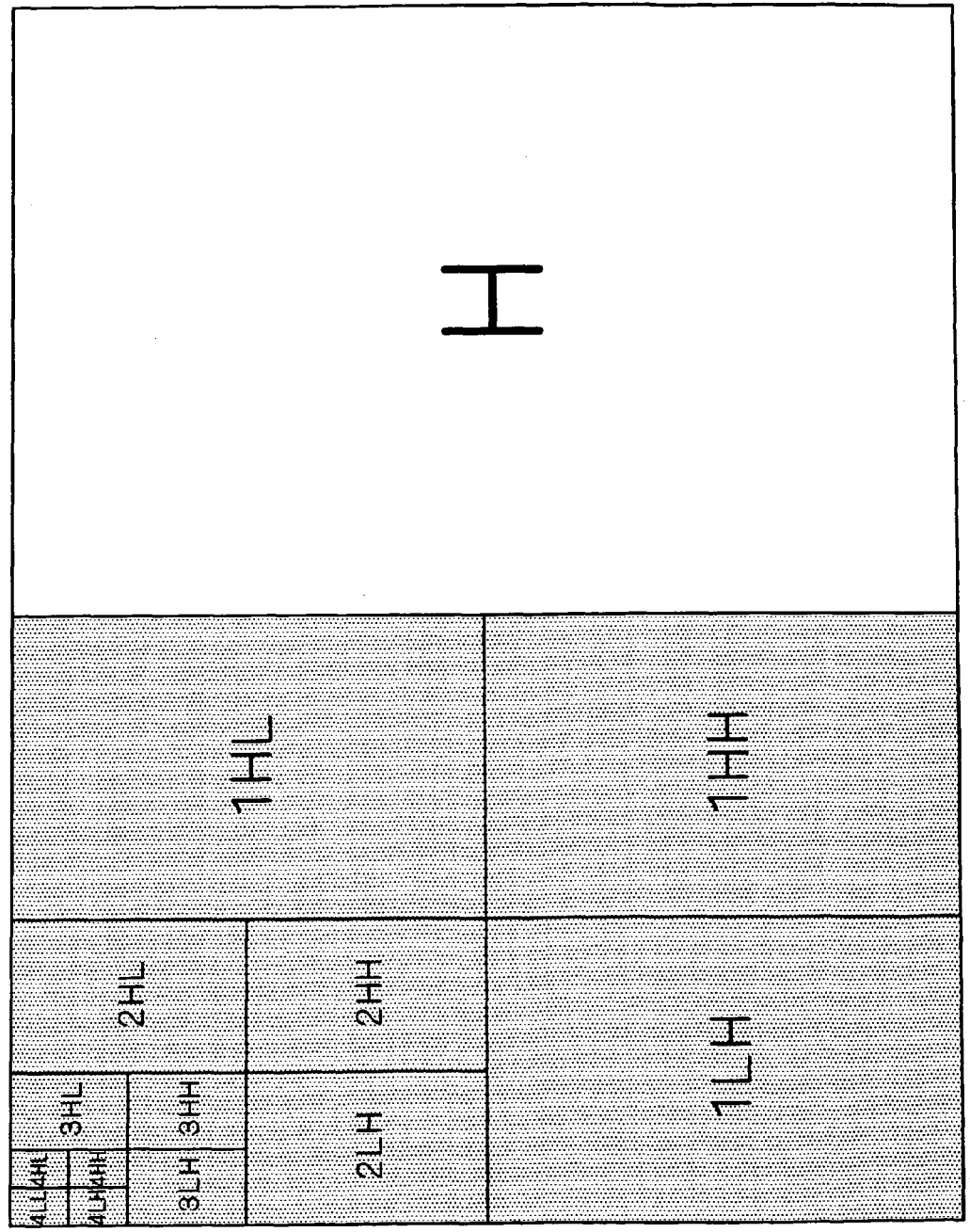
FIG. 6 shows a wavelet plane of color difference signals in YUV 422 format.

In YUV 422 image data, the amount of data for the color difference signals U and V is one-half of that for the luminance signal Y, and in YUV 420 image data, it is one fourth. A wavelet plane of the luminance signal Y subjected to DWT is as shown in FIG. 5. Assuming that one half of the data amount is equivalent to one application of DWT in the horizontal direction to the wavelet plane shown in FIG. 5, the dotted area in FIG. 6 is the wavelet plane of the color difference signals U and V in YUV 422 format. Similarly, assuming that one fourth of the data amount is equivalent to each one application of DWT in the horizontal and vertical directions to the wavelet plane shown in FIG. 5, the dotted area in FIG. 7 is the wavelet plane of the color difference signals U and V in YUV 420 format.

In YUV 422 format, it is assumed that the horizontal component is subjected to one more filtering than the vertical component as shown in FIG. 6. Thus, the above equations (7) for calculating the 2-D synthesis filter coefficients and the 2-D weighting coefficients can be rewritten as the following equations (9):

$$\begin{cases} S_{LL[D]}[n_1, n_2] = S_{L[D]}[n_1]S_{L[D+1]}[n_2] \Rightarrow G_{LL[D]} = G_{L[D]} \cdot G_{L[D+1]} \\ S_{HL[d]}[n_1, n_2] = S_{L[d]}[n_1]S_{H[d+1]}[n_2] \Rightarrow G_{HL[d]} = G_{L[d]} \cdot G_{H[d+1]} \\ S_{LH[d]}[n_1, n_2] = S_{H[d]}[n_1]S_{L[d+1]}[n_2] \Rightarrow G_{LH[d]} = G_{H[d]} \cdot G_{L[d+1]} \\ S_{HH[d]}[n_1, n_2] = S_{H[d]}[n_1]S_{H[d+1]}[n_2] \Rightarrow G_{HH[d]} = G_{H[d]} \cdot G_{H[d+1]} \end{cases} \quad (9)$$

Figure 7:
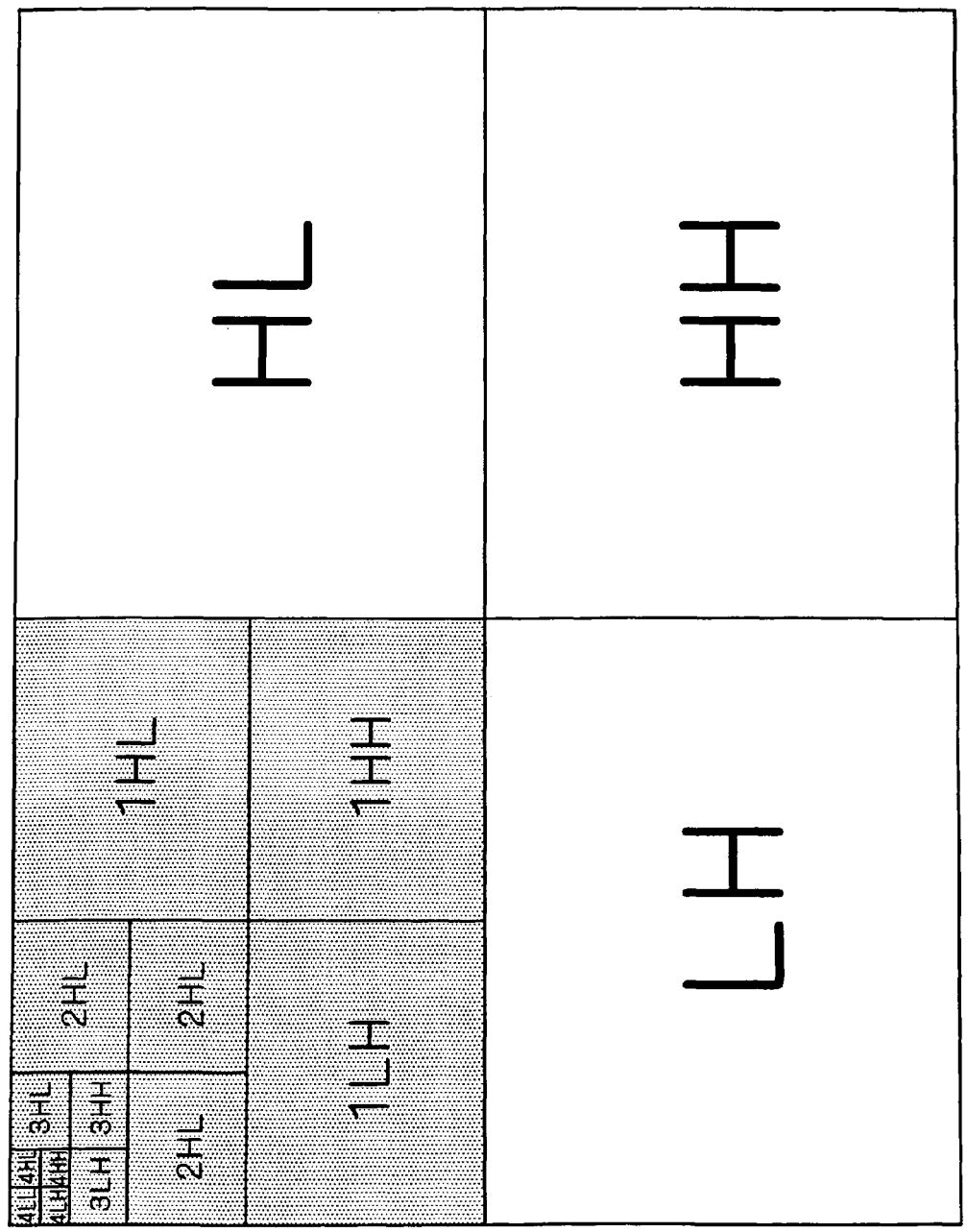
FIG. 7 shows a wavelet plane of color difference signals in YUV 420 format.

Similarly, in YUV 420 format, it is assumed that both the horizontal and vertical components are subjected to one more filtering as shown in FIG. 7. Thus, the above equations (7) can be rewritten as the following equations (10):

$$\begin{cases} S_{LL[D]}[n_1, n_2] = S_{L[D+1]}[n_1]S_{L[D+1]}[n_2] \Rightarrow G_{LL[D]} = G_{L[D+1]} \cdot G_{L[D+1]} \\ S_{HL[d]}[n_1, n_2] = S_{L[d+1]}[n_1]S_{H[d+1]}[n_2] \Rightarrow G_{HL[d]} = G_{L[d+1]} \cdot G_{H[d+1]} \\ S_{LH[d]}[n_1, n_2] = S_{H[d+1]}[n_1]S_{L[d+1]}[n_2] \Rightarrow G_{LH[d]} = G_{H[d+1]} \cdot G_{L[d+1]} \\ S_{HH[d]}[n_1, n_2] = S_{H[d+1]}[n_1]S_{H[d+1]}[n_2] \Rightarrow G_{HH[d]} = G_{H[d+1]} \cdot G_{H[d+1]} \end{cases} \quad (10)$$

Using the above equations (9) and (10) and the values given in TABLE 1, the norms of the color difference signals in YUV 422 and 420 formats are obtained, the results of which are shown in TABLEs 5 and 6, respectively.

TABLE 5

Norms of color difference signals in YUV 422 format

| Decomposition Level | LL | HL | LH | HH |
|---|---|---|---|---|
| 1 | 2.84680 | 1.378933 | 1.46443 | 0.70934 |
| 2 | 5.89044 | 2.92722 | 2.85321 | 1.41813 |
| 3 | 11.93911 | 6.01632 | 5.93409 | 2.99028 |
| 4 | 23.96952 | 12.12908 | 12.07864 | 6.11205 |
| 5 | 47.98675 | 24.30912 | 24.28230 | 12.30092 |
| 6 | 95.99766 | 48.64413 | 48.63048 | 24.64213 |
| 7 | 192.00744 | 97.30127 | 97.29440 | 49.30780 |
| 8 | 384.02095 | 194.60905 | 194.60561 | 98.61965 |
| 9 | 768.04494 | 389.22135 | 389.21963 | 197.24444 |
| 10 | 1536.09140 | 778.44433 | 778.44347 | 394.49144 |

TABLE 6

Norms of color difference signals in YUV 420 format

| Decomposition Level | LL | HL | LH | HH |
|---|---|---|---|---|
| 1 | 4.12241 | 1.996813 | 1.99681 | 0.96722 |
| 2 | 8.41674 | 4.18337 | 4.18337 | 2.07926 |
| 3 | 16.93557 | 8.53412 | 8.53412 | 4.30048 |
| 4 | 33.92493 | 17.16673 | 17.16673 | 8.68672 |
| 5 | 67.87717 | 34.38520 | 34.38520 | 17.41885 |
| 6 | 135.76805 | 68.79666 | 68.79666 | 34.86079 |
| 7 | 271.54296 | 137.60651 | 137.60651 | 69.73317 |
| 8 | 543.08936 | 275.21962 | 273.21962 | 139.47215 |
| 9 | 1086.18043 | 550.44255 | 550.44255 | 278.94721 |
| 10 | 2172.36172 | 1100.88675 | 1100.88675 | 557.89587 |

Next, according to the description of the first non-patent literature, the energy weighting factor $W_{b[i]}^{csf}$ for subband b[i] can be expressed as the product of energy weighting factors for that subband in the horizontal and vertical directions, which can be expressed by the following equations (11):

$$\begin{cases} \sqrt{W_{LL[D]}^{csf}} = 1 \\ \sqrt{W_{HL[d]}^{csf}} = \sqrt{W_{L[d]}^{csf}} \cdot \sqrt{W_{H[d]}^{csf}} \\ \sqrt{W_{LH[d]}^{csf}} = \sqrt{W_{H[d]}^{csf}} \cdot \sqrt{W_{L[d]}^{csf}} \\ \sqrt{W_{HH[d]}^{csf}} = \sqrt{W_{H[d]}^{csf}} \cdot \sqrt{W_{H[d]}^{csf}} \end{cases} \quad (11)$$

The energy weighting factor for the luminance signal Y in YUV 422 or 420 image data can be obtained from the above equations (11). In the YUV 444 format, all the energy weighting factors for the luminance signal and the color difference signals can be obtained from the above equations (11).

For the color difference signals U and V in YUV 422 format, since it is assumed as above described that the horizontal component is subjected to one more filtering than the vertical component, energy weighting factors for those signals can be expressed by the following equations (12), instead of the above equations (11).

$$\begin{cases} \sqrt{W_{LL[D]}^{csf}} = 1 \\ \sqrt{W_{HL[d]}^{csf}} = \sqrt{W_{L[d]}^{csf}} \cdot \sqrt{W_{H[d+1]}^{csf}} \\ \sqrt{W_{LH[d]}^{csf}} = \sqrt{W_{H[d]}^{csf}} \cdot \sqrt{W_{L[d+1]}^{csf}} \\ \sqrt{W_{HH[d]}^{csf}} = \sqrt{W_{H[d]}^{csf}} \cdot \sqrt{W_{H[d+1]}^{csf}} \end{cases} \quad (12)$$

Similarly, for the color difference signals U and V in YUV 420 format, since it is assumed that both the horizontal and vertical components are subjected to one more filtering, energy weighting factors for those signals can be expressed by the following equations (13), instead of the above equations (11).

$$\begin{cases} \sqrt{W_{LL[D]}^{csf}} = 1 \\ \sqrt{W_{HL[d]}^{csf}} = \sqrt{W_{L[d+1]}^{csf}} \cdot \sqrt{W_{H[d+1]}^{csf}} \\ \sqrt{W_{LH[d]}^{csf}} = \sqrt{W_{H[d+1]}^{csf}} \cdot \sqrt{W_{L[d+1]}^{csf}} \\ \sqrt{W_{HH[d]}^{csf}} = \sqrt{W_{H[d+1]}^{csf}} \cdot \sqrt{W_{H[d+1]}^{csf}} \end{cases} \quad (13)$$

The values of the energy weighting factors for the color difference signals U and V for "Viewing distance of 1000", "Viewing distance of 1700", "Viewing distance of 3000", obtained from the description of the second non-patent literature, are shown in TABLEs 7 to 9. In those and following tables, Cb and Cr represent the color difference signals U and V, respectively.

TABLE 7

Energy weighting factors $\sqrt{W_{b[t]}^{csf}}$ (Viewing distance 1000)

| | Decomposition Level | $\sqrt{W_{L[n]}^{csf}}$ | $\sqrt{W_{H[n]}^{csf}}$ |
|---|---|---|---|
| Cb | 1 | 068333 | 0.33732 |
| | 2 | 0.81063 | 0.55604 |
| | 3 | 0.89207 | 0.72918 |
| | 4 | 0.94018 | 0.84398 |
| | 5 | 0.96735 | 0.91301 |
| Cr | 1 | 0.75074 | 0.44778 |
| | 2 | 0.85423 | 0.64725 |
| | 3 | 0.91782 | 0.79063 |
| | 4 | 0.95462 | 0.88101 |
| | 5 | 0.97523 | 0.93401 |

TABLE 8

Energy weighting factors $\sqrt{W_{b[t]}^{csf}}$ (Viewing distance 1700)

| | Decomposition Level | $\sqrt{W_{L[n]}^{csf}}$ | $\sqrt{W_{H[n]}^{csf}}$ |
|---|---|---|---|
| Cb | 1 | 0.55396 | 0.17658 |
| | 2 | 0.71767 | 0.39024 |
| | 3 | 0.83345 | 0.60190 |
| | 4 | 0.90584 | 0.76107 |
| | 5 | 0.94801 | 0.86364 |
| Cr | 1 | 0.63889 | 0.27772 |
| | 2 | 0.77922 | 0.49856 |
| | 3 | 0.87223 | 0.68622 |
| | 4 | 0.92840 | 0.81606 |
| | 5 | 0.96060 | 0.89620 |

TABLE 9

Energy weighting factors $\sqrt{W_{b[t]}^{csf}}$ (Viewing distance 3000)

| | Decomposition Level | $\sqrt{W_{L[n]}^{csf}}$ | $\sqrt{W_{H[n]}^{csf}}$ |
|---|---|---|---|
| Cb | 1 | 0.39897 | 0.05842 |
| | 2 | 0.58653 | 0.21145 |
| | 3 | 0.74224 | 0.43082 |
| | 4 | 0.84937 | 0.63510 |
| | 5 | 0.91531 | 0.78344 |
| Cr | 1 | 0.49254 | 0.12238 |
| | 2 | 0.66780 | 0.31727 |
| | 3 | 0.79932 | 0.53628 |
| | 4 | 0.84470 | 0.71395 |
| | 5 | 0.93565 | 0.83374 |

Using the values given in TABLEs 7 to 9 and the above equations (11) to (13), energy weighting factors for image data in YUV 422 and 420 formats are obtained, which are shown in TABLEs 10 to 12 and 13 to 15, respectively.

TABLE 10

Energy weighting factors $\sqrt{W_{b[t]}^{csf}}$ in YUV 422 format (Viewing distance 1000)

| | Decomposition Level | LL | HL | LH | HH |
|---|---|---|---|---|---|
| Y | 1 | X | 0.75635 | 0.75635 | 0.57306 |
| | 2 | X | 0.99828 | 0.99828 | 0.99656 |
| | 3 | X | 1 | 1 | 1 |
| | 4 | X | 1 | 1 | 1 |
| | 5 | 1 | 1 | 1 | 1 |
| Cb | 1 | X | 0.37996 | 0.27344 | 0.18756 |
| | 2 | X | 0.59109 | 0.49603 | 0.40545 |
| | 3 | X | 0.75289 | 0.68556 | 0.61541 |
| | 4 | 1 | 0.85839 | 0.81642 | 0.77056 |
| | 5 | | | | |
| Cr | 1 | X | 0.48592 | 0.38251 | 0.28983 |
| | 2 | X | 0.67538 | 0.59406 | 0.51174 |
| | 3 | X | 0.80861 | 0.75476 | 0.69656 |
| | 4 | 1 | 0.89163 | 0.85919 | 0.82287 |
| | 5 | | | | |

TABLE 11

Energy weighting factors $\sqrt{W_{b[t]}^{csf}}$ in YUV 422 format (Viewing distance 1700)

| | Decomposition Level | LL | HL | LH | HH |
|---|---|---|---|---|---|
| Y | 1 | X | 0.30719 | 0.30719 | 0.10892 |
| | 2 | X | 0.86159 | 0.86159 | 0.75234 |
| | 3 | X | 1 | 1 | 1 |
| | 4 | X | 1 | 1 | 1 |
| | 5 | 1 | 1 | 1 | 1 |
| Cb | 1 | X | 0.21617 | 0.12672 | 0.06891 |
| | 2 | X | 0.43197 | 0.32525 | 0.23489 |
| | 3 | X | 0.63431 | 0.54522 | 0.45808 |
| | 4 | 1 | 0.78232 | 0.72152 | 0.65729 |
| | 5 | | | | |
| Cr | 1 | X | 0.31853 | 0.216414 | 0.13846 |
| | 2 | X | 0.53471 | 0.43486 | 0.34212 |
| | 3 | X | 0.71179 | 0.63708 | 0.55999 |
| | 4 | 1 | 0.83203 | 0.78390 | 0.73135 |
| | 5 | | | | |

TABLE 12

Energy weighting factors $\sqrt{W_{b[t]}^{csf}}$ in YUV 422 format (Viewing distance 3000)

| | Decomposition Level | LL | HL | LH | HH |
|---|---|---|---|---|---|
| Y | 1 | X | 0.03818 | 0.03849 | 0.00308 |
| | 2 | X | 0.41063 | 0.41063 | 0.18276 |
| | 3 | X | 0.92105 | 0.92105 | 0.84832 |
| | 4 | X | 1 | 1 | 1 |
| | 5 | 1 | 1 | 1 | 1 |
| Cb | 1 | X | 0.08436 | 0.03427 | 0.01235 |
| | 2 | X | 0.25269 | 0.15695 | 0.09110 |
| | 3 | X | 0.47139 | 0.36593 | 0.27362 |
| | 4 | 1 | 0.66543 | 0.58131 | 0.49756 |
| | 5 | | | | |
| Cr | 1 | X | 0.15627 | 0.08173 | 0.03883 |
| | 2 | X | 0.35813 | 0.25360 | 0.17014 |
| | 3 | X | 0.57068 | 0.47444 | 0.38288 |
| | 4 | 1 | 0.73761 | 0.66801 | 0.59525 |
| | 5 | | | | |

TABLE 13

Energy weighting factors $\sqrt{W_{b[i]}{}^{csf}}$ in YUV 420 format
(Viewing distance 1000)

| | Decomposition Level | LL | HL | LH | HH |
|---|---|---|---|---|---|
| Y | 1 | X | 0.75635 | 0.75635 | 0.57306 |
|   | 2 | X | 0.99828 | 0.99828 | 0.99656 |
|   | 3 | X | 1 | 1 | 1 |
|   | 4 | X | 1 | 1 | 1 |
|   | 5 | 1 | 1 | 1 | 1 |
| Cb | 1 | X | 0.45074 | 0.45074 | 0.30918 |
|    | 2 | X | 0.65048 | 0.65048 | 0.5317 |
|    | 3 | X | 0.79349 | 0.79349 | 0.71230 |
|    | 4 | 1 | 0.88320 | 0.88320 | 0.83358 |
|    | 5 |   |   |   |   |
| Cr | 1 | X | 0.55290 | 0.55290 | 0.41894 |
|    | 2 | X | 0.72566 | 0.72566 | 0.62510 |
|    | 3 | X | 0.84103 | 0.84103 | 0.77618 |
|    | 4 | 1 | 0.91088 | 0.91088 | 0.87238 |
|    | 5 |   |   |   |   |

TABLE 14

Energy weighting factors $\sqrt{W_{b[i]}{}^{csf}}$ in YUV 420 format
(Viewing distance 1700)

| | Decomposition Level | LL | HL | LH | HH |
|---|---|---|---|---|---|
| Y | 1 | X | 0.30719 | 0.30719 | 0.10892 |
|   | 2 | X | 0.86159 | 0.86159 | 0.74234 |
|   | 3 | X | 1 | 1 | 1 |
|   | 4 | X | 1 | 1 | 1 |
|   | 5 | 1 | 1 | 1 | 1 |
| Cb | 1 | X | 0.28007 | 0.28006 | 0.15229 |
|    | 2 | X | 0.50165 | 0.50165 | 0.36228 |
|    | 3 | X | 0.68940 | 0.68940 | 0.57922 |
|    | 4 | 1 | 0.81877 | 0.81876 | 0.74588 |
|    | 5 |   |   |   |   |
| Cr | 1 | X | 0.38849 | 0.38849 | 0.24857 |
|    | 2 | X | 0.59854 | 0.59854 | 0.47089 |
|    | 3 | X | 0.75763 | 0.75763 | 0.66595 |
|    | 4 | 1 | 0.86089 | 0.86089 | 0.80317 |
|    | 5 |   |   |   |   |

TABLE 15

Energy weighting factors $\sqrt{W_{b[i]}{}^{csf}}$ in YUV 420 format
(Viewing distance 3000)

| | Decomposition Level | LL | HL | LH | HH |
|---|---|---|---|---|---|
| Y | 1 | X | 0.03849 | 0.03849 | 0.00308 |
|   | 2 | X | 0.41063 | 0.41063 | 0.18276 |
|   | 3 | X | 0.92105 | 0.92105 | 0.84832 |
|   | 4 | X | 1 | 1 | 1 |
|   | 5 | 1 | 1 | 1 | 1 |
| Cb | 1 | X | 0.12402 | 0.12402 | 0.04471 |
|    | 2 | X | 0.31977 | 0.31977 | 0.18561 |
|    | 3 | X | 0.53943 | 0.53944 | 0.40335 |
|    | 4 | 1 | 0.71709 | 0.71709 | 0.61378 |
|    | 5 |   |   |   |   |
| Cr | 1 | X | 0.21187 | 0.21187 | 0.10066 |
|    | 2 | X | 0.42866 | 0.42866 | 0.28759 |
|    | 3 | X | 0.63163 | 0.63163 | 0.50973 |
|    | 4 | 1 | 0.78009 | 0.78009 | 0.69513 |
|    | 5 |   |   |   |   |

Substituting the values of the norms given in TABLEs 5 and 6 into the above equations (1) and (2) yields a normalized quantization step size $\Delta_b$; and substituting the values of the norms given in TABLEs 5 and 6 and the values of the energy weighting factors given in TABLEs 10 through 15 into the above equations (1) and (8) yields a visually weighted quantization step size $\Delta_b$ which takes into account the human visual characteristics.

For example, let the quantization parameter $Q_P=16$ for all of the luminance signal Y and the color difference signals U and V. Then, the quantization step sizes $\Delta_b$ for the luminance signal Y and the color difference signals U and V when visual weighting optimized for a viewing distance of 3000 is applied to YUV 422 color image data are obtained by using the values of the norms given in TABLE 5, the values of the energy weighting factors given in TABLE 12, and the above equations (1) and (8). The results are shown in TABLEs 16 to 18.

TABLE 16

Quantization step sizes $\Delta_b$ for luminance signal Y in YUV 422 format
(Viewing distance 3000)

| Decomposition Level | LL | HL | LH | HH |
|---|---|---|---|---|
| 1 | X | 411.08509 | 411.08509 | 10002.06109 |
| 2 | X | 19.51345 | 19.51345 | 90.51394 |
| 3 | X | 4.15253 | 4.15253 | 9.07090 |
| 4 | X | 1.87483 | 1.87483 | 3.72051 |
| 5 | 0.47163 | 0.93204 | 0.93204 | 1.84189 |

TABLE 17

Quantization step sizes $\Delta_b$ for color difference signal U(Cb)
in YUV 422 format (Viewing distance 3000)

| Decomposition Level | LL | HL | LH | HH |
|---|---|---|---|---|
| 1 | X | 137.54117 | 4318.85669 | 1825.95586 |
| 2 | X | 21.62733 | 35.73031 | 123.85047 |
| 3 | X | 5.64163 | 7.36832 | 19.55534 |
| 4 | 0.66751 | 1.98239 | 2.27873 | 5.26121 |

TABLE 18

Quantization step sizes $\Delta_b$ for color difference signal V(Cr)
in YUV 422 format (Viewing distance 3000)

| Decomposition Level | LL | HL | LH | HH |
|---|---|---|---|---|
| 1 | X | 74.25290 | 133.68785 | 580.93701 |
| 2 | X | 15.25998 | 22.11257 | 66.31184 |
| 3 | X | 4.66012 | 5.68306 | 13.97490 |
| 4 | 0.66751 | 1.78840 | 1.98298 | 4.39776 |

Here, the quantization parameter $Q_P$ used in obtaining the quantization step size $\Delta_b$ for each of the luminance signal Y and the color difference signals U and V is not necessarily the same value, and different values may be used according to the contents of image data. For example, for enhancement of color components, the quantization parameter $Q_P$ used for the color difference signals U and V may be smaller than that used for the luminance signal Y. In this way, an appropriate quantization parameter $Q_P$ for each signal may be used in consideration of the contents of image data and the like. Similarly, different values may or may not be used for the values of the energy weighting factors.

The image-quality control unit 23 obtains the quantization step size $\Delta_b$ in this way and gives it to the quantization unit 14. Then, the quantization unit 14 performs quantization with the given quantization step size $\Delta_b$ for each subband. At this time, if the quantization step size $\Delta_b$ is less than 1, it is multiplied by powers of 2 to obtain a value of 1 or more before quantization, as previously described.

As so far described, the image-quality control method according to this preferred embodiment implements image quality control by quantization and thereby allows precise control according to target image quality with the noise reduction effect (beautiful skin effect). Since there is no need for complicated processes such as finding an optimal solution, high speed processing is allowed with minimal operations. Besides, it is also possible to generate a compressed image with high display image quality after quantization in consideration of the human visual characteristics.

Sorting and Bit Shifting

The quantization unit 14 shown in FIG. 1 performs sorting and bit shifting on quantized data based on the quantization step size $\Delta_b$.

Allocating higher rate preferentially to data quantized with smaller quantization step sizes $\Delta_b$ and bit shifting these data so as not to be affected by truncation in the rate control, degradation in image quality caused by coding processing can be avoided or suppressed.

Hereinbelow, sorting and bit shifting based on the quantization step size $\Delta_b$ is described.

First, when a predetermined value of the quantization parameter $Q_P$ is specified as target image quality, the image-quality control unit 23 calculates the quantization step size $\Delta_b$ based on this value by the aforementioned method and gives it to the quantization unit 14.

Upon receipt of the quantization step size $\Delta_b$, the quantization unit 14, based on this value, quantizes image data having been subjected to DWT in the DWT unit 13.

Then, the quantization unit 14 sorts quantized data in ascending order of quantization step size $\Delta_b$.

When the data is quantized with the quantization step size $\Delta_b$ which has been converted into a value of 1 or more as previously described, the sorting is performed according to the quantization step size $\Delta_b$ before quantization; however, at this time, the data is shifted to the left by the number of bits corresponding to the exponent of the powers of 2 used for multiplication to convert the quantization step size $\Delta_b$. A specific form of processing is described hereinbelow.

For example, the quantization step size $\Delta_b$ for the subband LL5 in TABLE 4 is 0.47163, but for actual quantization of image data, this value is multiplied by $2^2$ to obtain the value of 1.88652. Therefore, data in the subband LL5 is shifted to the left by 2 bits in correspondence with the exponent of $2^2$ used for multiplication to convert the quantization step size $\Delta_b$. Similarly, the quantization step size $\Delta_b$ of 0.93204 for the subband HL5 is multiplied by 2 to obtain the value of 1.86408 for quantization. Therefore, the coded data AD in the subband HL5 is shifted to the left by 1 bit in correspondence with the exponent of 2 used for multiplication. That is, when quantization is performed with the quantization step size $\Delta_b$ multiplied by $2^m$, data concerned is shifted to the left by the number of bits corresponding to the exponent m, whereby the priority of data is controlled.

Figure 8:
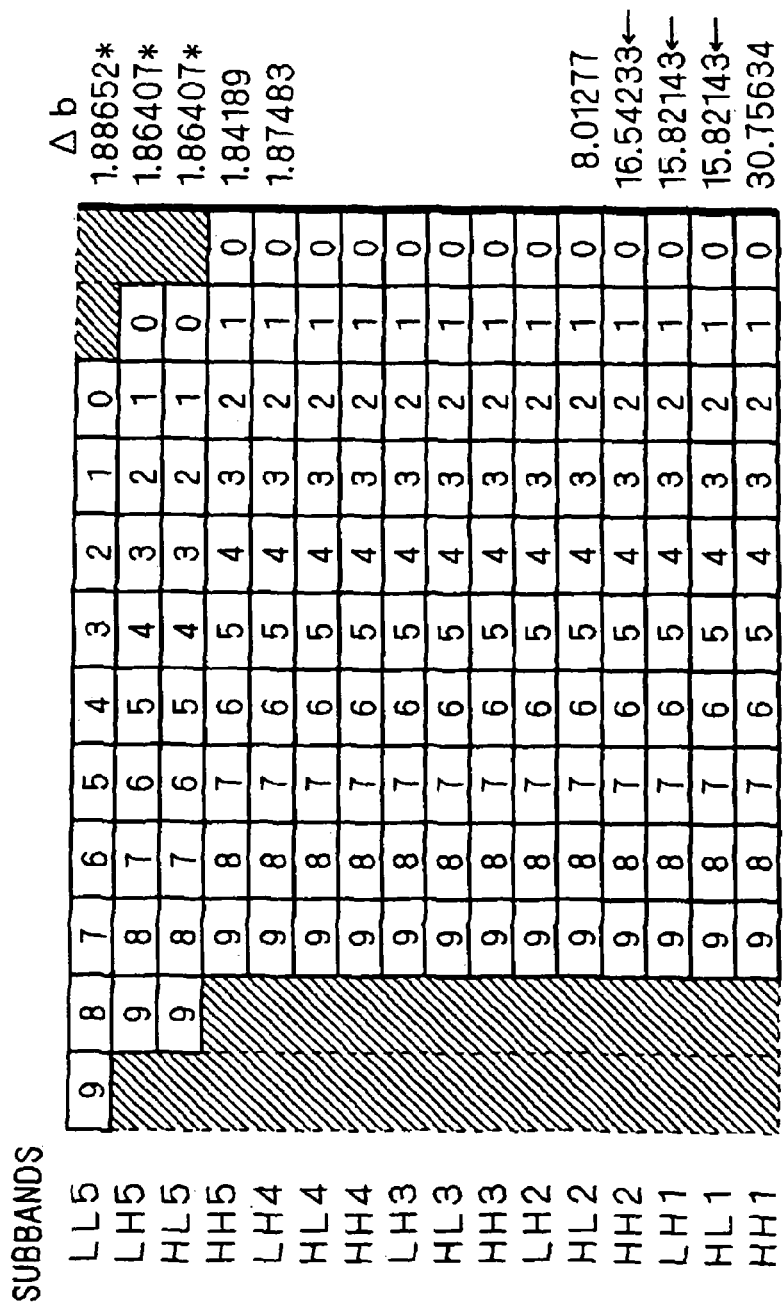
FIG. 8 shows bit shifting of a code sequence.

FIG. 8 shows transform coefficients subjected to such a bit-shift operation based on the quantization step size $\Delta_b$ shown in TABLE 4. In the figure, each part of the code sequence marked with an asterisk indicates that the value of the quantization step size $\Delta_b$ is converted for quantization, and the numbers 0 through 9 on each bit of the code sequence indicate a number of a bit plane to which that bit belongs. Here, the LSB number is 0, and the MSB number is 9.

Figure 9:
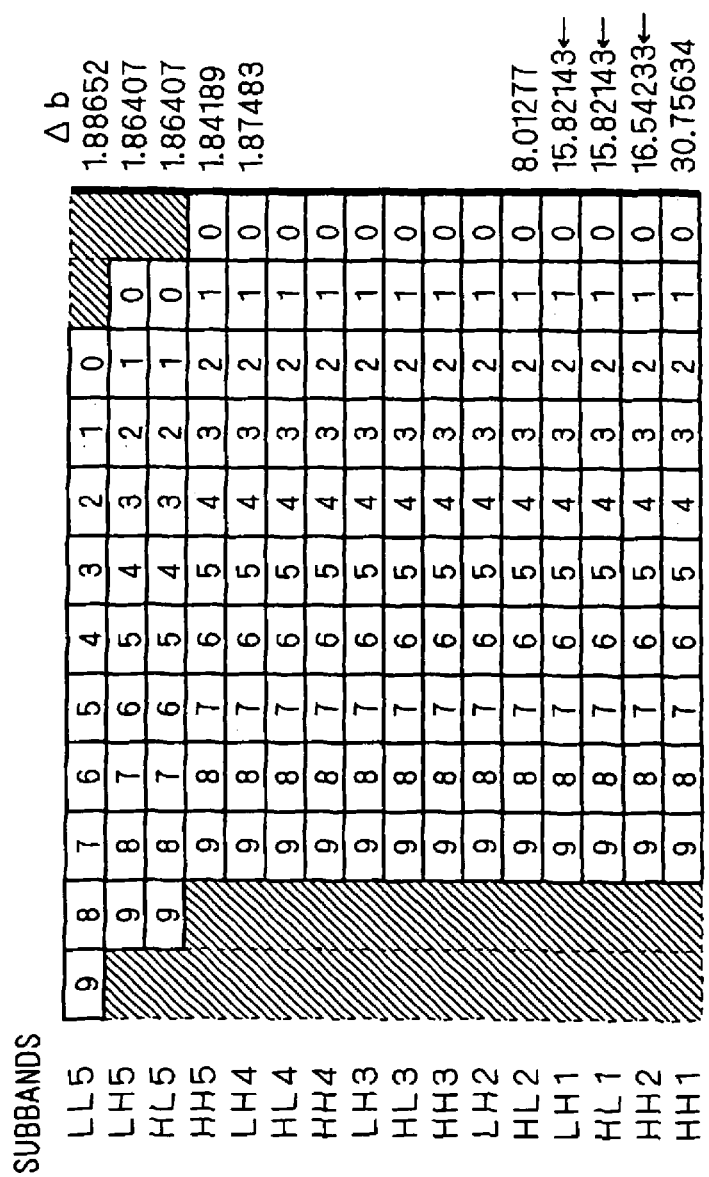
FIG. 9 shows sorting of a code sequence.

Then, the transform coefficients are sorted in ascending order of the quantization step size $\Delta_b$ used for quantization. In FIG. 8, the values of the quantization step sizes $\Delta_b$ in the parts indicated by the arrows are not in ascending order; thus, those parts are sorted. The code sequence sorted in this way is shown in FIG. 9. The arrows in FIG. 9 indicate parts of the code sequence whose positions are shifted from their positions in FIG. 8.

Similar processing can also be performed in the case of color images and in the case where the quantization step size $\Delta_b$ is calculated by applying visual weighting.

For example, when, as previously described, the quantization parameter $Q_P=16$ and visual weighting optimized for a viewing distance of 3000 is applied to YUV 422 color image data, the quantization step sizes $\Delta_b$ for the luminance signal Y and the color difference signals U and V are as shown in TABLEs 16 to 18.

At this time, the quantization step sizes $\Delta_b$ of less than 1 in TABLEs 16 to 18 are, as previously described, multiplied by powers of 2 for quantization. Then, the data which has been quantized with the converted quantization step size $\Delta_b$ is shifted to the left by the number of bits corresponding to the exponent of the powers of 2 used for multiplication of the original quantization step size $\Delta_b$.

Figure 10:
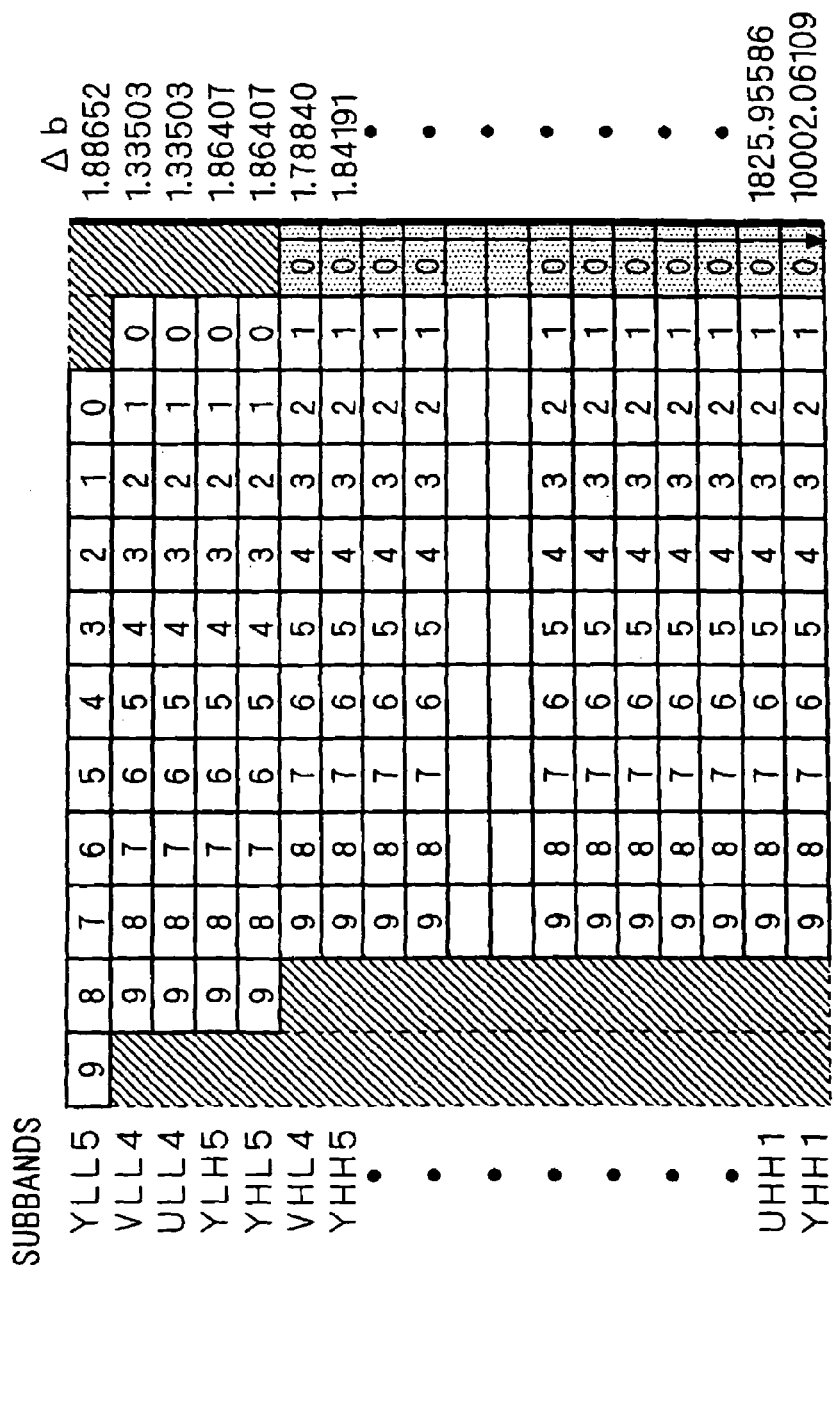
FIG. 10 shows sorting and bit shifting of a code sequence in YUV format.

In the case of color images, there are data on each of the luminance signal Y and the color difference signals U and V; however, all those data are sorted together in ascending order of the quantization step size $\Delta_b$ without being classified by signal. Resultant transform coefficients are shown in FIG. 10. In the figure, YLL5 represents data on the luminance signal Y in the subband LL5.

In this way, all the data on the luminance signal Y and the color difference signals U and V are subjected to aforementioned bit shifting and sorting processes.

The transform coefficients QD outputted from the quantization unit 14 are entropy coded on a block-by-block basis in the coefficient bit modeling unit 20 and arithmetic coding unit 21, and they are rate controlled in rate control unit 22.

Rate Control

The rate control unit 22 controls the rate of the coded data AD having been quantized in the quantization unit 14 and processed in the coefficient bit modeling unit 20 and arithmetic coding unit 21.

Using the sorted and bit-shifted code sequence as shown in FIG. 10, the rate control unit 22 truncates data so that the desired noise reduction effect can be obtained. The data truncation occurs in sequence from the rightmost bit. For example, in the case of FIG. 10, data is truncated from data of bit 0 in the subband VHL4 downwardly in sequence through data of bit 0 in the subband YHH5, and so on. If the desired noise reduction effect can be achieved by truncation of up to bit data in the subband YHH1, data in the dotted area in FIG. 10 will be truncated. If the desired noise reduction effect cannot be achieved by truncation of up to bit data in the subband YHH1, data will then be truncated from data of bit 0 in the subband VLL4 downwardly in sequence through data of bit 0 in the subband ULL4, data of bit 0 in the subband YLH5, and so on.

Figure 27:
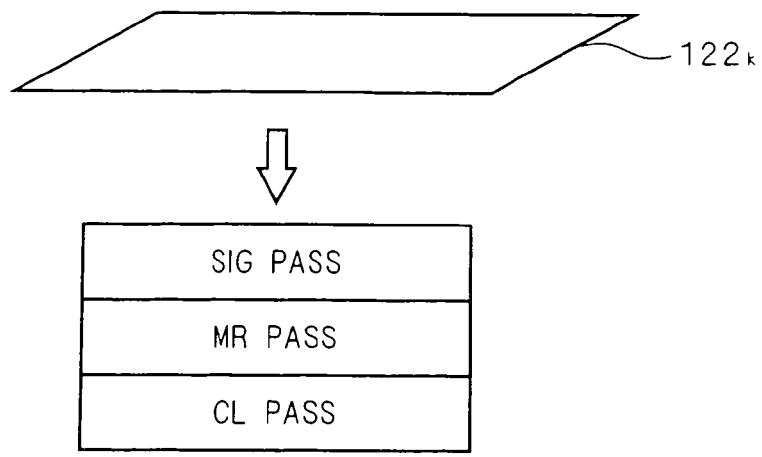
FIG. 27 is a schematic view showing three types of coding passes.
Figure 28:
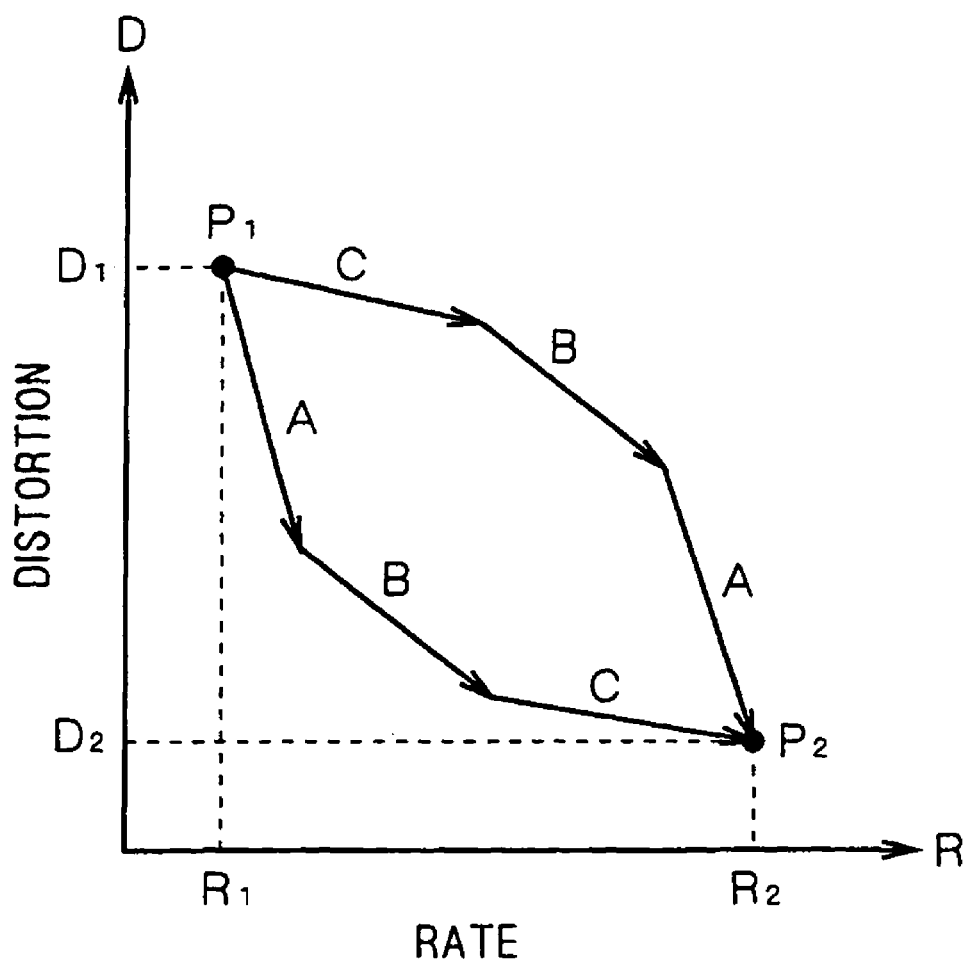
FIG. 28 shows an R-D curve representing the relationship between rate and distortion.

The bit data (bit plane) can be divided into the SIG pass, MR pass and CL pass, as shown in FIG. 27. The rate control performed by the rate control unit 22 may be implemented on a bit-plane-by-bit-plane basis as previously described, or alternatively, on a pass-by-pass basis.

In such case, the rate control unit 22 will truncate CL passes from the CL pass of number 0 in the subband VHL4 downwardly in sequence through the CL pass of number 0 in the subband YHH5, and so on. If the desired noise reduction effect cannot be achieved by truncation of up to the CL pass of number 0 in the subband YHH1, the process will subsequently go back to the subband VHL4, and MR passes will be truncated from the MR pass of number 0 in the subband VHL4 downwardly in sequence through the MR pass of number 0 in the subband YHH5, the MR pass of number 0 in the subband YHH1, and so on. The data truncation is continued until the desired noise reduction effect is achieved.

Now, it should be noted that if, at a stage of being inputted to the rate control unit 22, target image quality intended by the user has already been achieved, the aforementioned rate control is not necessary.

In this way, according to the compression encoder 1 of the present embodiment, rate control is performed by sorting and bit shifting data with the value of the quantization step size $\Delta_b$ and further by truncating bit data or passes in each subband from the lower-order bits until the desired noise reduction effect is achieved (i.e., until the desired target image quality is obtained). The desired noise reduction effect is thereby achieved on the whole screen.

Unlike the conventional method, the rate control process according to this preferred embodiment eliminates the necessity of calculating the amount of distortion in each coding pass for rate-distortion optimization and thereby achieves highly efficient rate control with high immediacy and with significantly reduced overhead.

Sorting and bit shifting with the quantization step size $\Delta_b$ is not necessarily required to be executed by the quantization unit 14, but may be executed by, for example, the rate control unit 22. In this case, the rate control unit 22 truncates data after sorting and bit shifting coded data AD with the quantization step size $\Delta_b$. In this case, the present embodiment can also be implemented by a compression encoder with the quantization unit 14 not provided with the bit shifting function, only by changing the function and operation of the rate control unit 22.

Second Preferred Embodiment
Compression Encoder

Figure 11:
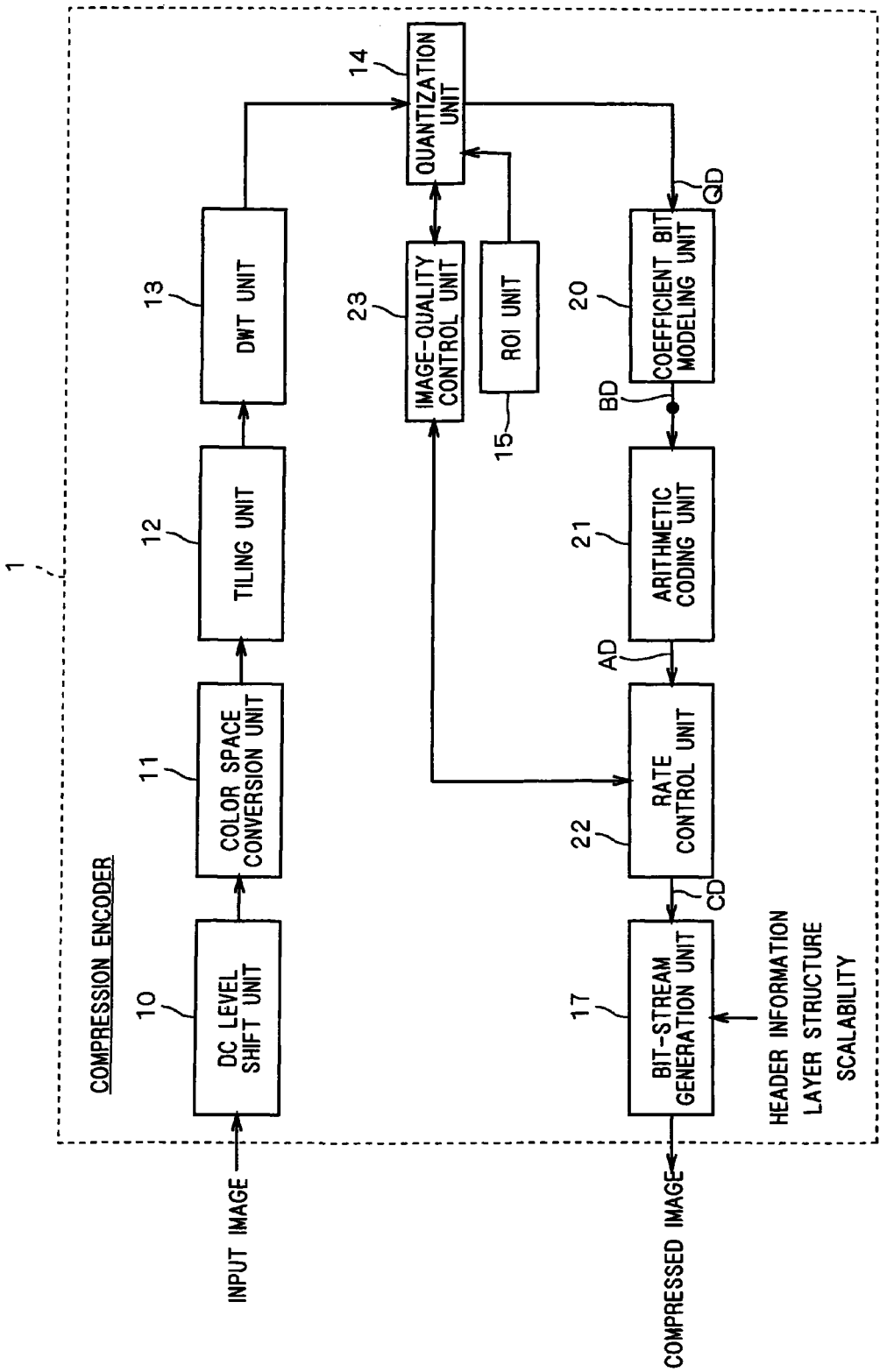
FIG. 11 shows a general configuration of a compression encoder according to a second preferred embodiment of the invention.

FIG. 11 is a functional block diagram showing a general configuration of a compression encoder 1 according to a second preferred embodiment of the invention. A ROI unit 15 is added to the compression encoder 1 according to the first preferred embodiment.

All or parts of the units 10 to 15, 17 and 20 to 23 in the compression encoder 1 may consist of hardware or programs that run on a microprocessor. This program may be stored in a computer-readable recording medium.

The configuration and operation of the compression encoder 1 according to this preferred embodiment is described below mainly with respect to differences from the first preferred embodiment.

The quantization unit 14 has the function of performing scalar quantization on transform coefficients inputted from the DWT unit 13 according to quantization parameters which are determined by the image-quality control unit 23. The quantization unit 14 also has the function of performing a bit-shift operation on a region of interest (hereinafter referred to as a ROI) which is specified by the ROI unit 15 in order to obtain the noise reduction effect. The method of ROI setting in the ROI unit 15 and the method of performing a bit-shift operation in the quantization unit 14 taking ROI into account will be described later in detail.

The rate control unit 22 has the function of controlling the rate of the coded data AD inputted from the arithmetic coding unit 21 according to instructions from the image-quality control unit 23. That is, the rate control unit 22 has the function of performing post-quantization in which the coded data AD is sequentially truncated in ascending order of priority on a subband-by-subband, bit-plane-by-bit-plane, or pass-by-pass basis in order to achieve the noise reduction effect on ROIs considering a target rate (final rate of a compressed image). The method of performing rate control in the rate control unit 22 will be described later in detail.

ROI Setting

The ROI unit 15 shown in FIG. 11 specifies, in image data, a region where the noise reduction effect is desired to be achieved by rate control which will be described later, as a ROI.

Hereinbelow, a method of specifying a ROI is described.

Figure 12:
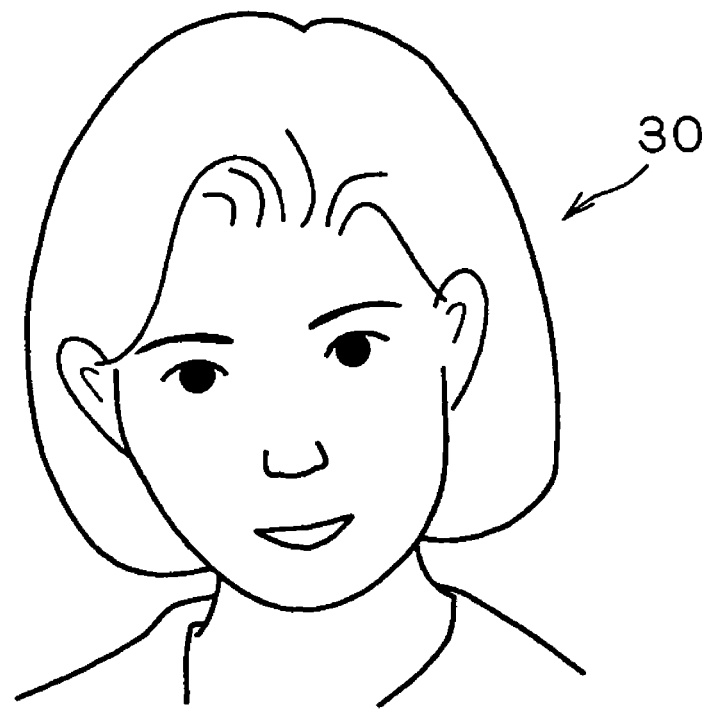
FIG. 12 shows an example of an original image.

The ROI unit 15 gives a mask signal for specifying an important region as a ROI, to image data having been subjected to wavelet transform. For example, to specify only a face region below the forehead where the beautiful skin effect is desired to be obtained as a ROI in image data (original image) 30 of a person as shown in FIG. 12, a single mask region 31 is defined as shown by a hollow portion in FIG. 13A, and this region is specified as a ROI.

This mask region 31 can be specified using a pointing input device such as a so-called mouse in correspondence with the original image 30 while looking at the original image 30 on the screen of a display. An alternative form may be adopted in which the mask region 31 is automatically specified by analysis of image data, for example, by extracting a predetermined region including a skin-colored region.

Figure 13A:
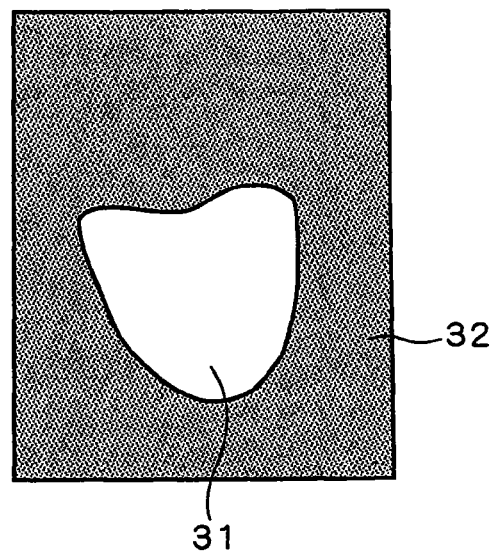
FIG. 13A shows a single mask region specified in the original image shown in FIG. 12.
Figure 13B:
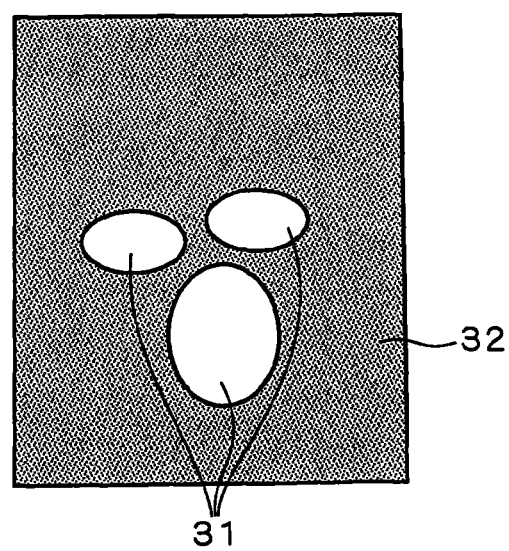
FIG. 13B shows a plurality of mask regions specified in the original image shown in FIG. 12.

While FIG. 13A shows an example of specifying a single ROI on the original image 30, a plurality of regions such as a left eye region, a right eye region, and a region including nose and mouth may be specified as ROIs as shown by hollow portions in FIG. 13B. In that case, these regions are specified by different mask signals, respectively.

Then, the remaining region with the mask region 31 for all the ROIs being excluded is specified as a non-ROI 32 (see FIGS. 13A and 13B).

In the case where a plurality of mask signals are given, priorities may be assigned to the plurality of mask signals. The higher the priority, the greater the volume of information, for example, the lower the bit rate, which increases the beautiful skin effect.

Then, the mask region 31 is expanded into a wavelet plane to generate a mask signal (FIG. 14).

Here, the method of converting a mask signal into a region corresponding to a wavelet plane depends upon the number of taps of filter for use in wavelet transform.

Figure 15:
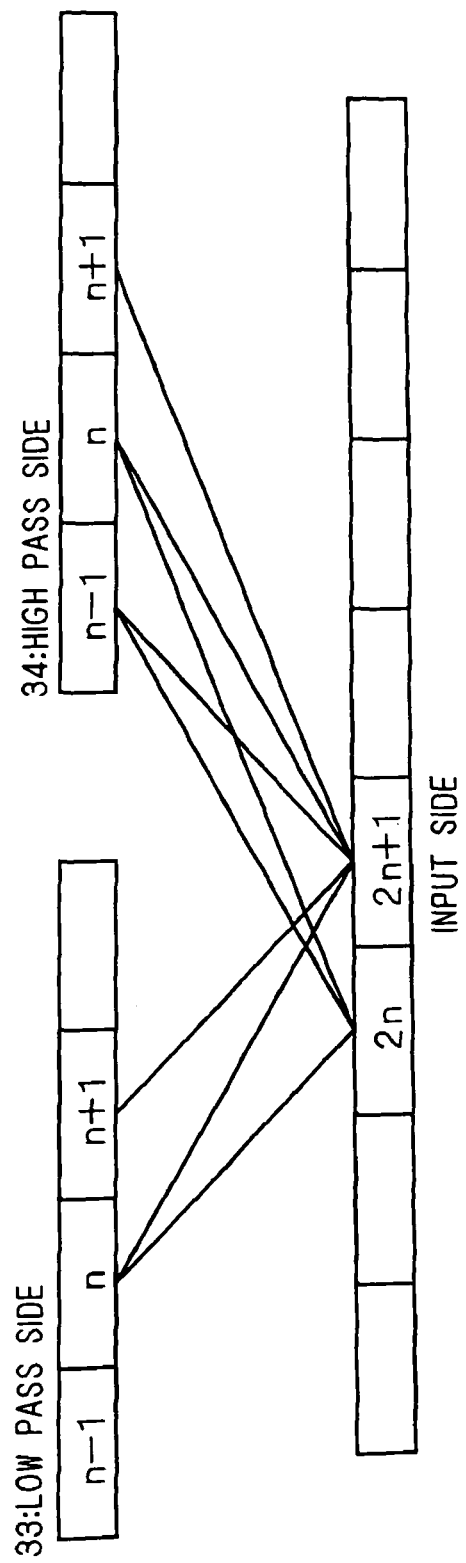
FIG. 15 shows the correspondence of mask regions between the low- and high-pass sides and input side in an inverse wavelet 5/3-tap filter.

For example, let a reversible 5/3-tap filter (having a low-pass filter with 5 taps on the decomposition side and a high-pass filter with 3 taps on the decomposition side) is applied to arithmetic operations in wavelet transform, as shown in FIG. 15. Then, in the case where even-numbered or 2n-th pixel data of an original image is specified as a ROI, a mask signal is expanded into a wavelet plane assuming that the n-th data in a low-pass filter 33 and the (n−1)- and n-th data in a high-pass filter 34 represent a ROI. In the case where odd-numbered or (2n+1)-th pixel data of an original image is specified as a ROI, a mask signal is expanded into a wavelet plane assuming that the n- and (n+1)-th data in the low-pass filter 33 and the (n−1)-, n-, and (n+1)-th data in the high-pass filter 34 represent a ROI. Although FIG. 15 only shows the correspondence between an original image and the first-level wavelet plane, similar recursive expansion is also performed in expansion into deeper levels.

Figure 16:
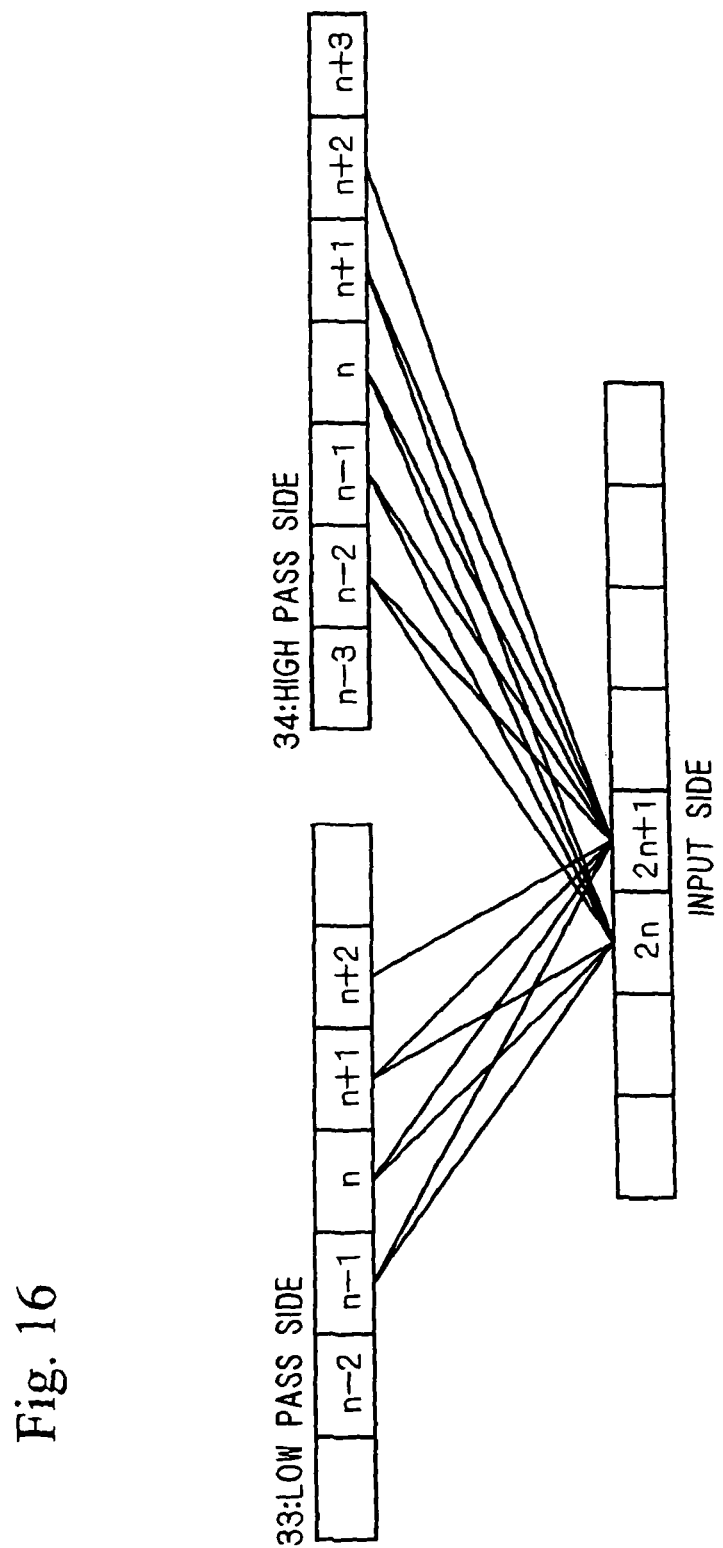
FIG. 16 shows the correspondence of mask regions between the low- and high-pass sides and input side in an inverse wavelet 9/7-tap filter.

Alternatively, for example, let a Daubechies 9/7-tap filter (having a low-pass filter with 9 taps on the decomposition side and a high-pass filter with 7 taps on the decomposition side) is applied to arithmetic operations in wavelet transform, as shown in FIG. 16. Then, in the case where even-numbered or 2n-th pixel data of an original image is specified as a ROI, a mask signal is expanded into a wavelet plane assuming that the (n−1)-, n-, and (n+1)-th data of the low-pass filter 33 and the (n−2)-, (n−1)-, n-, and (n+1)-th data in the high-pass filter 34 represent a ROI. In the case where odd-numbered or (2n+1)-th pixel data in an original image is specified as a ROI, a mask signal is expanded into a wavelet plane assuming that the (n−1)-, n-, (n+1)-, and (n+2)-th data in the low-pass filter 33 and the (n−2)-, (n−1)-, n-, (n+1)-, and (n+2)-th data in the high-pass filter 34 represent a ROI. Although FIG. 16 only shows the correspondence between an original image and the first-level wavelet plane, similar recursive expansion is also performed in expansion into deeper levels.

Referring to the correspondences shown in FIGS. 15 and 16, a mask signal is expanded into a wavelet plane considering a region, if any, where a non-ROI specified relative to a particular piece of pixel data of an original image and a ROI specified relative to another piece of pixel data of the original image overlap each other, as a ROI. While the method of converting a mask signal has been discussed in each case of the reversible 5/3-tap filter and Daubechies 9/7-tap filter, rate control will be described later using the Daubechies 9/7-tap filter by way of example.

Figure 14A:
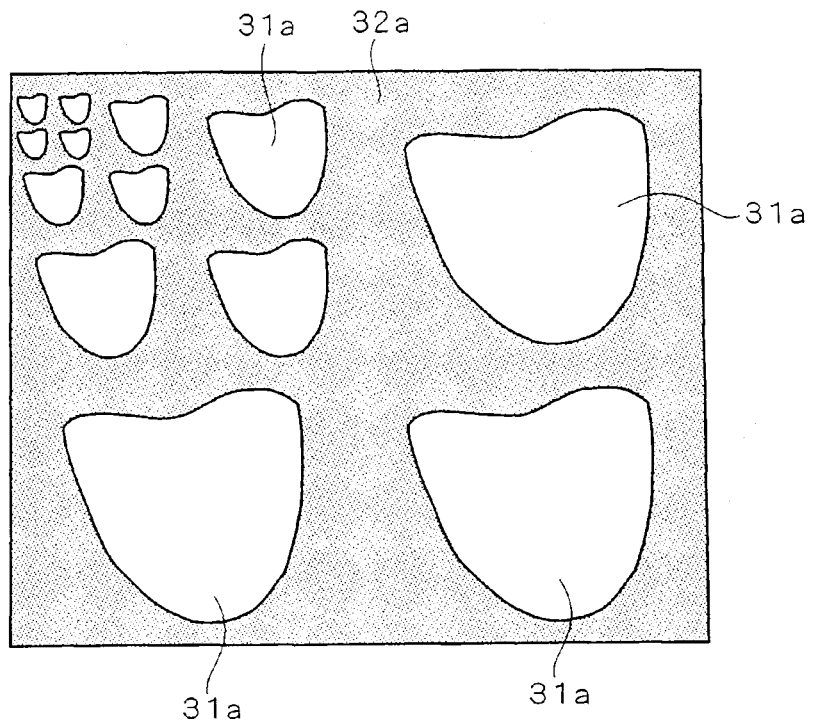
FIGS. 14A and 14B respectively show the mask regions shown in FIGS. 13A and 13B expanded into a wavelet plane.

A hollow region 31*a* shown in FIG. 14A is a region (hereinafter referred to as an "expanded mask region") obtained by expanding the mask region (ROI) 31 shown in FIG. 13A into a wavelet plane in the above-described manner. A mask signal corresponding to this expanded mask region 31*a* is generated and given to image data having been subjected to wavelet transform. The character 32*a* shown in FIG. 14A denotes a region (hereinafter referred to as an "expanded non-mask region") obtained by expanding the non-ROI 32 into the wavelet plane. In an area where the mask region (ROI) 31 and the non-ROI 32 overlap each other, the mask region (ROI) 31 is selected and allocated to such area. That is, a region assigned higher priority is selected and allocated to such area.

Figure 14B:
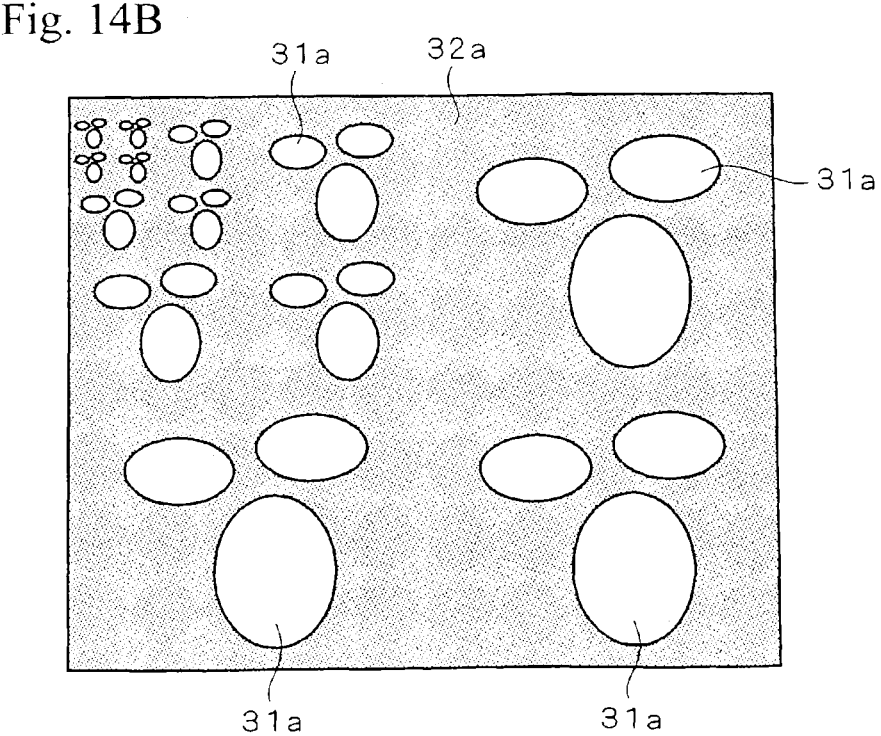

In the case where a plurality of ROIs are specified as mask regions 31 as shown in FIG. 13B, a plurality of mask regions 31*a* are expanded into a wavelet plane as shown in FIG. 14B. In such case of the plurality of mask regions 31*a* expanded into a wavelet plane, priority setting may be performed at this stage. As previously described, when a plurality of ROIs 31 are specified in an original image, each expanded mask region 31*a* is generated on the wavelet plane for each ROI 31. All expanded mask regions 31*a* that correspond to one ROI 31 are assigned the same degree of priority on the basis of the priority assigned to the ROI 31, and finally, all of the expanded mask regions 31*a* are assigned priorities.

When a plurality of ROIs 31 are specified in an original image, a plurality of expanded mask regions 31*a* may overlap one another in a region passed through the low-pass filter 33 on the wavelet plane. In such case, priority is determined considering the overlapping region as an expanded mask region 31*a* assigned the highest priority among the plurality of expanded mask regions 31*a* overlapping one another.

A region for which no mask signal is generated in image data having been subjected to wavelet transform shall be an expanded non-mask region 32*a*. The expanded non-mask region 32*a* is assigned lower priority than all the expanded mask regions 31*a*.

In this way, a plurality of ROIs may be specified, and each of the ROIs may be assigned priority.

Information on specified ROIs (ROI information) is inputted to the quantization unit 14.

Sorting and Bit Shifting

The quantization unit 14 shown in FIG. 11 performs sorting and bit shifting on quantized data based on the quantization step size $\Delta_b$ and ROI information given by the aforementioned ROI unit 15.

Higher rate is allocated preferentially to data quantized with smaller quantization step sizes $\Delta_b$ and these data are bit shifted so as not to be affected by truncation in the rate control, similarly to the first preferred embodiment.

Now, bit shifting based on the ROI information is described hereinbelow.

As previously described, the present invention achieves processing in the cases of monochrome images and color images, and further, in the cases where visual weighting are applied to those images. The specifics of processing on YUV 422 color image data are described hereinbelow in the case where the quantization parameter $Q_P$=16 as shown in FIG. 10 and visual weighting optimized for a viewing distance of 3000 is applied to the color images.

First, as previously described, the ROI unit 15 specifies a ROI and a non-ROI and gives information on setting these regions to the quantization unit 14. The setting information contains information as to whether each pixel data represents a ROI or non-ROI as well as information related to priorities, if assigned to a plurality of ROIs.

The quantization unit 14 divides the transform coefficients shown in FIG. 10 further into ROI data and non-ROI data based on received ROI information.

More specifically, FIG. 10 shows the transform coefficients having been subjected to bit shifting and sorting with the quantization step size $\Delta_b$ as previously described, for each of the subbands shown in FIG. 5. As is apparent from comparison between FIG. 5 and FIG. 14A or 14B, the transform coefficient for each of the subbands shown in FIG. 10 actually includes data on the expanded mask regions 31*a* and data on the expanded non-mask region 32*a* shown in FIG. 14A or 14B.

Figure 17:
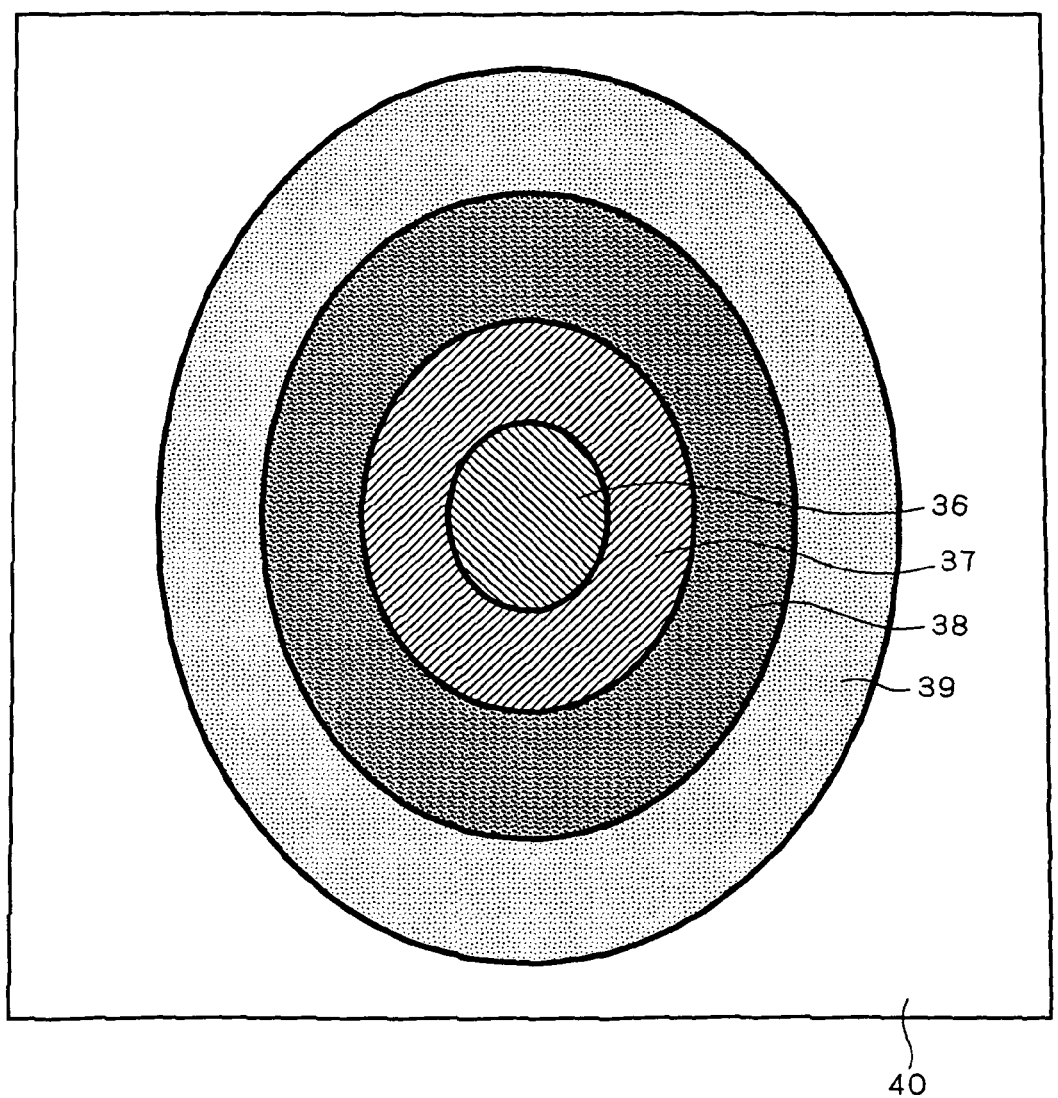
FIG. 17 shows an example of specifying ROIs in image data.

According to the present embodiment, as shown in FIG. 17, let four ROIs 36 to 39 and a non-ROI 40 are specified on image data, and the ROIs 36, 37, 38 and 39 are assigned priorities in this order from highest to lowest. The ROI unit 15 expands these ROIs into a wavelet plane based on the ROI information and priority information, as previously described.

It should be noted that expansion of the ROIs is performed in each of the code blocks obtained by dividing image data having been subjected to DWT and expanded into a wavelet plane into rectangular regions of predetermined size. More specifically, for example, each subband is divided into code blocks of predetermined size of, e.g., 32×32 pixels, and each code block is judged whether it represents a ROI or not, and when judged as a ROI, priority is assigned, and then expanded into the wavelet plane.

In the case where one code block contains a plurality of ROIs, a ROI assigned the highest priority among those ROIs is selected and allocated to that code block. In the case where one code block contains both a ROI and a non-ROI, the ROI is selected and assigned to that code block. That is, a region assigned higher priority is selected and allocated to each code block. Alternatively, a new priority may be defined in accordance with the proportion of the ROI and non-ROI contained in one code block.

Figure 18:
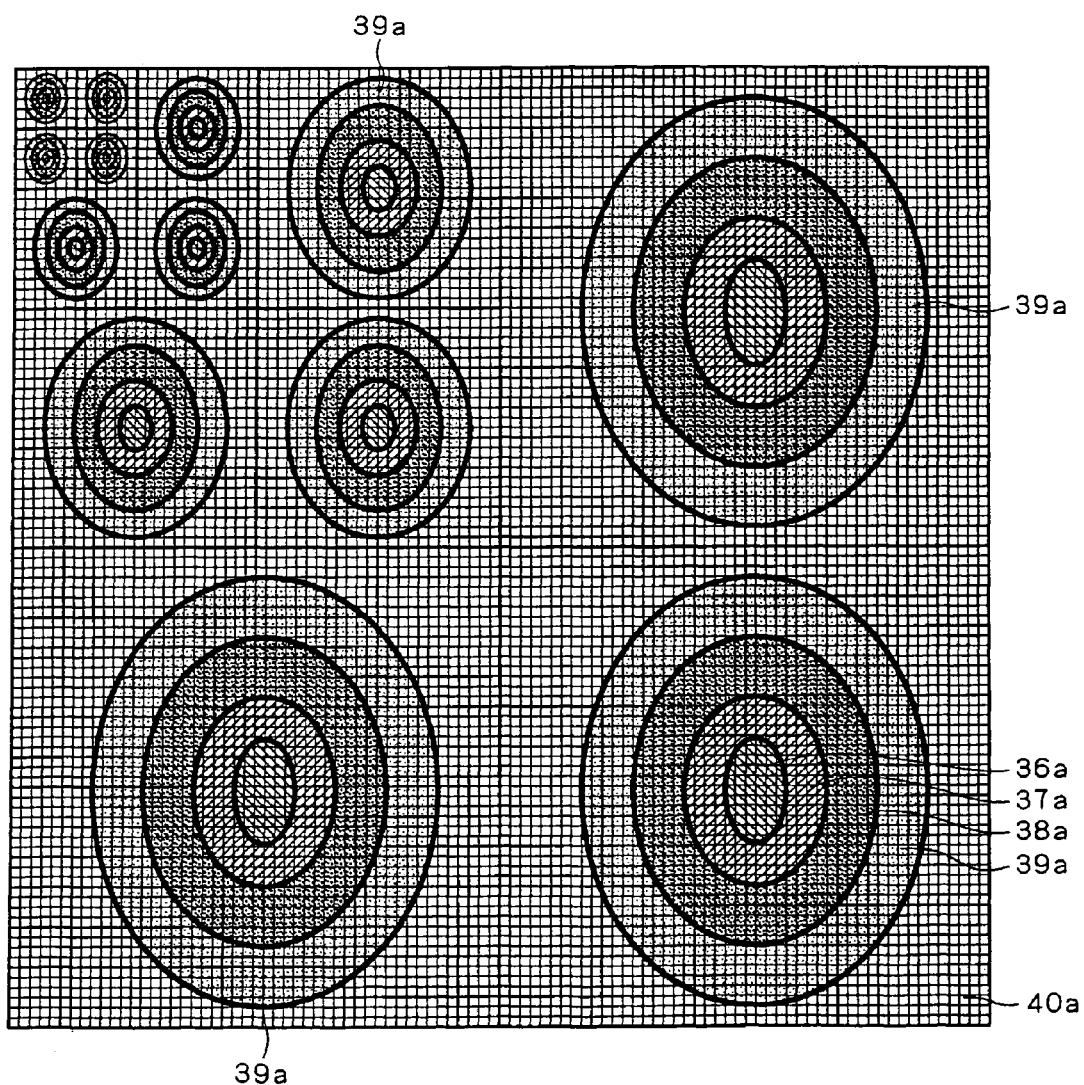
FIG. 18 shows the ROIs shown in FIG. 17 as expanded into a wavelet plane.

As a result, following the setting of the ROIs shown in FIG. 17 and priority setting, an expanded wavelet plane as shown in FIG. 18 is obtained. In FIG. 18, each rectangle constituting a subband represents a code block.

The ROI information set in this way is inputted to the quantization unit 14 shown in FIG. 1.

Although FIG. 10 shows a code sequence for each of the subbands shown in FIG. 5, data in each subband shown in FIG. 10 actually contains all of data on four expanded mask regions 36a to 39a and an expanded non-mask region 40a shown in FIG. 18, as understood from the comparison between FIGS. 5 and 18.

Figure 19:
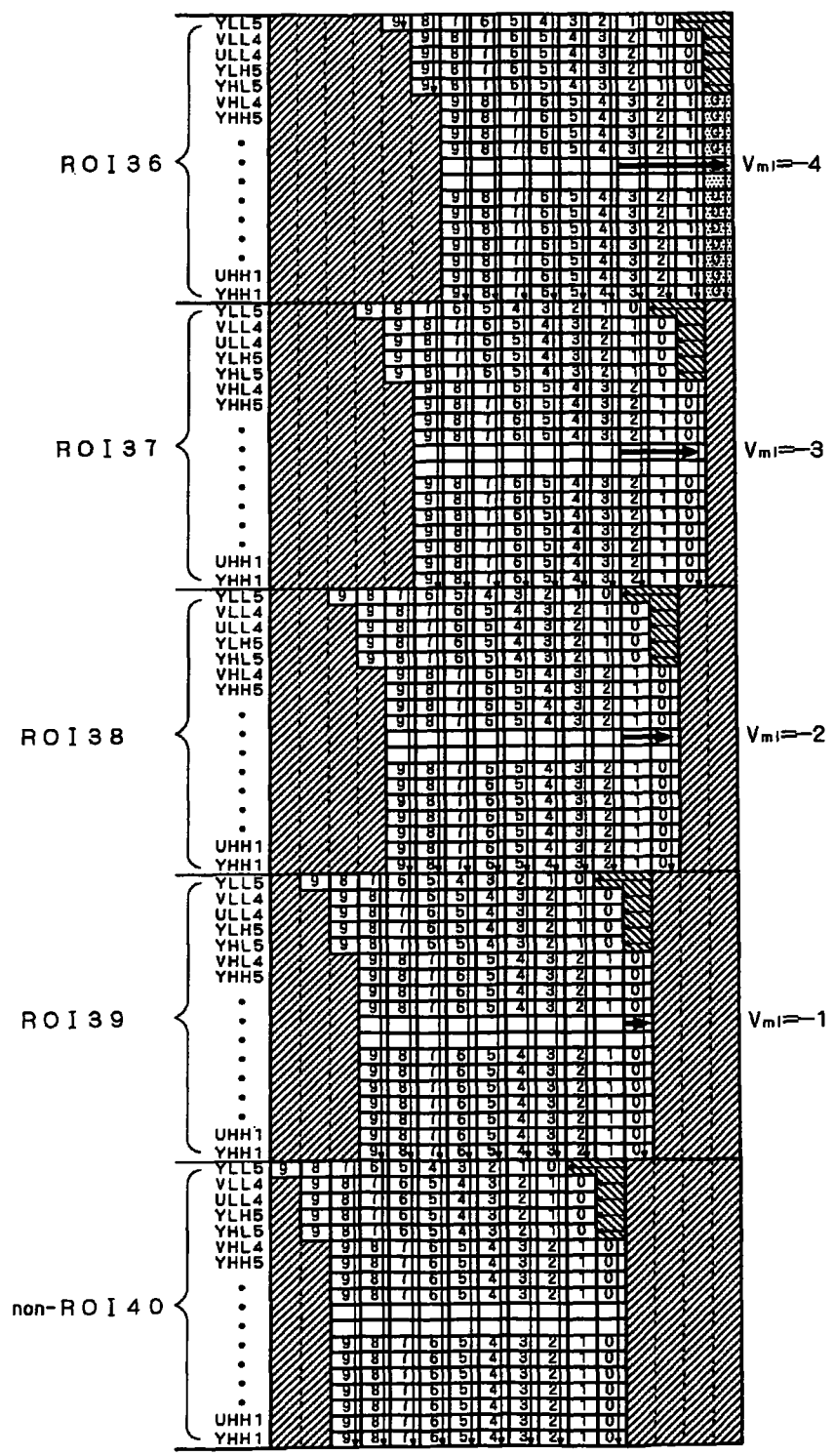
FIG. 19 shows sorting and bit shifting of a code sequence based on information on setting the ROIs shown in FIG. 17.

The quantization unit 14 divides the code sequence shown in FIG. 10 into data on the four ROIs 36 to 39 and data on the non-ROI 40 as shown in FIG. 19 based on the ROI information given by the ROI unit 15.

Further, the quantization unit 14 shifts each data on the ROIs 36 to 39 to the right by a predetermined number of bits. In the case where a plurality of ROIs are specified, the amount of shift is set greater for data assigned higher priority.

For example, in the case of FIG. 19, relative to the data on the non-ROI 40, the data on the ROI 39 assigned the lowest priority is shifted by 1 bit ($V_{m1}=-1$), the data on the ROI 38 assigned the second lowest priority by 2 bits ($V_{m1}=-2$), the data on the ROI 37 assigned the second highest priority by 3 bits ($V_{m1}=-3$), and the data on the ROI 36 assigned the highest priority by 4 bits ($V_{m1}=-4$), respectively, to the right.

It should be noted that the amount of shift of each of the data on the ROIs 36 to 39 and data on the non-ROI 40 may be a predetermined number of bits, or alternatively, may be changed to an arbitrary value according to the desired noise reduction effect and target quality of image data after compression and coding, and the like.

Further, the present embodiment is not limited to a form in which the data on the ROIs 36 to 39 and data on the non-ROI 40 are sorted in descending order of priority as shown in FIG. 19, but may be implemented by another form, for example, in which those data are sorted in ascending order of priority. Data ordering is determined taking into account, for example: the fact that rate control targeted for lower-order bit planes is effective in rate control which will be described later for achieving target image quality since lower-order bit planes include high-frequency components such as noise components; the relationship between the order of data truncation in the rate control at this time and priorities assigned to the ROIs 36 to 39 and non-ROI 40; the contents of image data on the ROIs 36 to 39 and non-ROI 40; and the like.

The transform coefficients QD outputted from the quantization unit 14 are entropy coded on a block-by-block basis in the coefficient bit modeling unit 20 and the arithmetic coding unit 21, and they are rate controlled in rate control unit 22.

Figure 29:
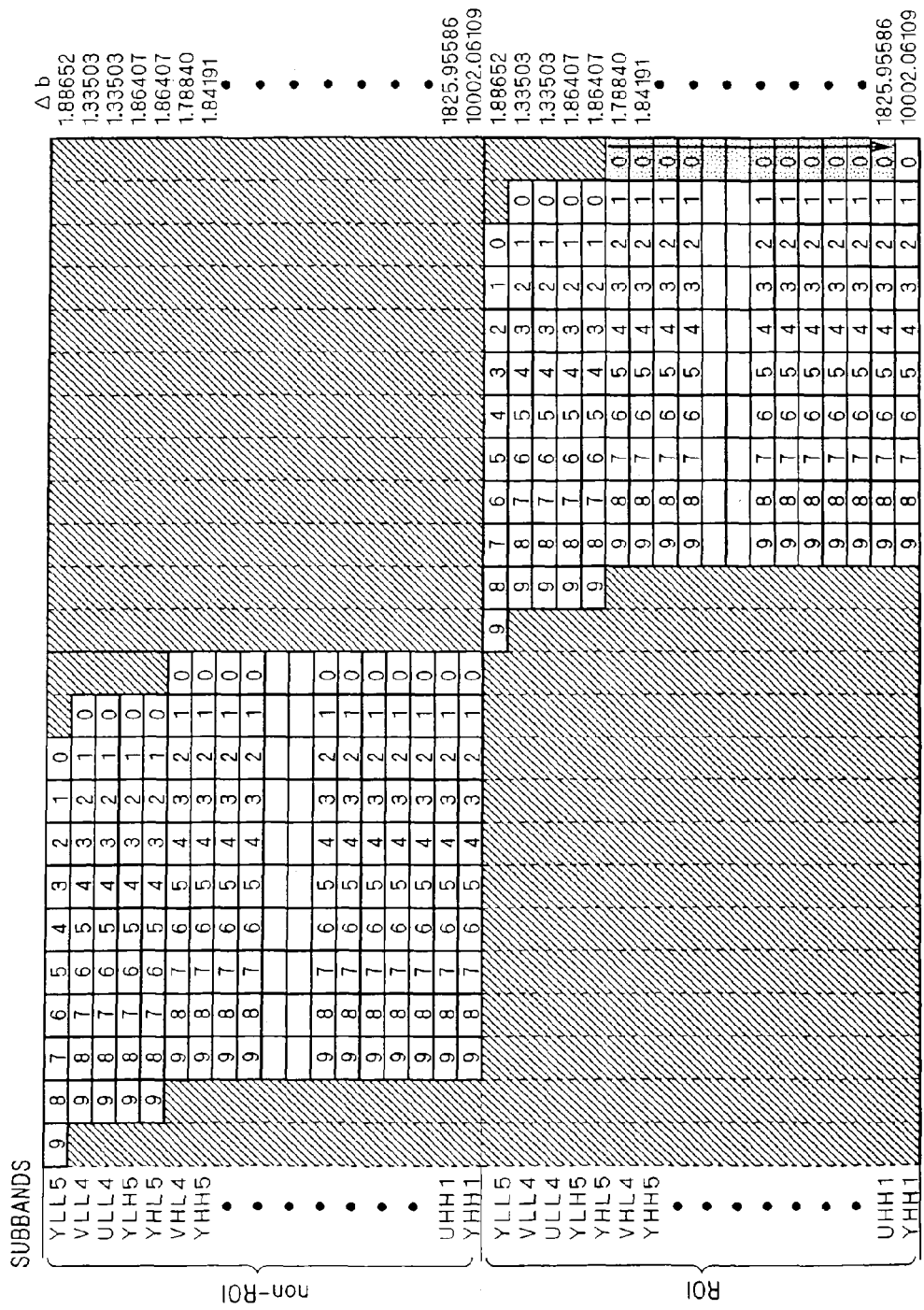
FIG. 29 shows shifting of ROI data in a quantization unit.

JPEG2000 Part 1 standardized by the second non-patent literature permits shifting a ROI and a non-ROI individually in the quantization unit 14 only when adopting the Max-shift method. Shifting shall therefore be performed to the right by a maximum value of ROI data, as shown in FIG. 29. ROIs are not necessarily generated on a block-by-block or data thereof is not necessarily shifted on a block-by-block basis, but the expanded mask regions 31a and the expanded non-mask region 32a shown in FIGS. 14A and 14B may be generated on a coefficient-by-coefficient basis on the wavelet plane, and data thereof may be shifted on a coefficient-by-coefficient basis.

It is therefore necessary to extend JPEG2000 Part 1 standardized by the second non-patent literature in order to assign a priority to each of a plurality of ROIs in the quantization unit 14 to perform shifting by an arbitrary amount. Shape data of a mask region in each subband and the amount of shift indicating the priority of each ROI are stored as extended data. Shape data of a mask region in each subband may be on a block-by-block basis or a coefficient-by-coefficient basis on the wavelet plane. When shape data of a mask region is stored on block-by-block basis, the amount of data to be stored can be reduced.

Rate Control

The rate control unit 22 controls the rate of the coded data AD having been quantized in the quantization unit 14 and processed in the coefficient bit modeling unit 20 and the arithmetic coding unit 21.

Using the sorted and bit-shifted code sequence as shown in FIG. 19, the rate control unit 22 truncates data so that the desired noise reduction effect can be obtained (i.e., so that target image quality can be obtained). The data truncation occurs in sequence from the rightmost bit. For example, data is truncated from data of bit 0 in the subband VHL4 in the code sequence for the ROI 36 shown in FIG. 19 downwardly in sequence through data of bit 0 in the subband YHH5, and so on. If the desired noise reduction effect can be achieved by truncation of up to bit data in the subband YHH1, data in the dotted area in FIG. 19 will be truncated. If the desired noise reduction effect cannot be achieved by truncation of up to bit data in the subband YHH1, data will then be truncated from data of bit 0 in the subband VLL4 for the ROI 36 downwardly in sequence through data of bit 0 in the subband ULL4, data of bit 0 in the subband YLH5, and so on. The data truncation is continued until the target image quality is achieved.

The bit data (bit plane) can be divided into the SIG pass, MR pass and CL pass, as shown in FIG. 27. The rate control performed by the rate control unit 22 may be implemented on a bit-plane-by-bit-plane basis as previously described, or alternatively, on a pass-by-pass basis.

In this way, according to the compression encoder 1 of the present embodiment, the bit data or pass in each subband is sorted and bit shifted with the value of the quantization step size $\Delta_b$ and further sorted and bit shifted based on ROI information, and is truncated from the lower-order bits until the desired noise reduction effect is obtained (i.e., until the target image quality is achieved), to thereby achieve rate control. This in turn allows precise control so that target image quality is achieved with the noise reduction effect.

Unlike the conventional method, the rate control process according to this preferred embodiment eliminates the necessity of calculating the amount of distortion in each coding pass for rate-distortion optimization and thereby achieves highly efficient rate control with high immediacy and with significantly reduced overhead. Image compression allows generation of an image with noise being removed.

The data truncation occurs in descending order of priority assigned to the ROIs. This allows preferential removal of a portion including high-frequency components such as noise components from ROI information assigned higher priority by rate control, which can achieve compression encoding while performing precise control so that target image quality is achieved with the noise reduction effect on ROIs assigned high priorities.

For instance, performing rate control specifying human skin as ROI allows wrinkles and blotches on the skin to be removed as noise components, so that the beautiful skin effect is obtained.

Figure 20:
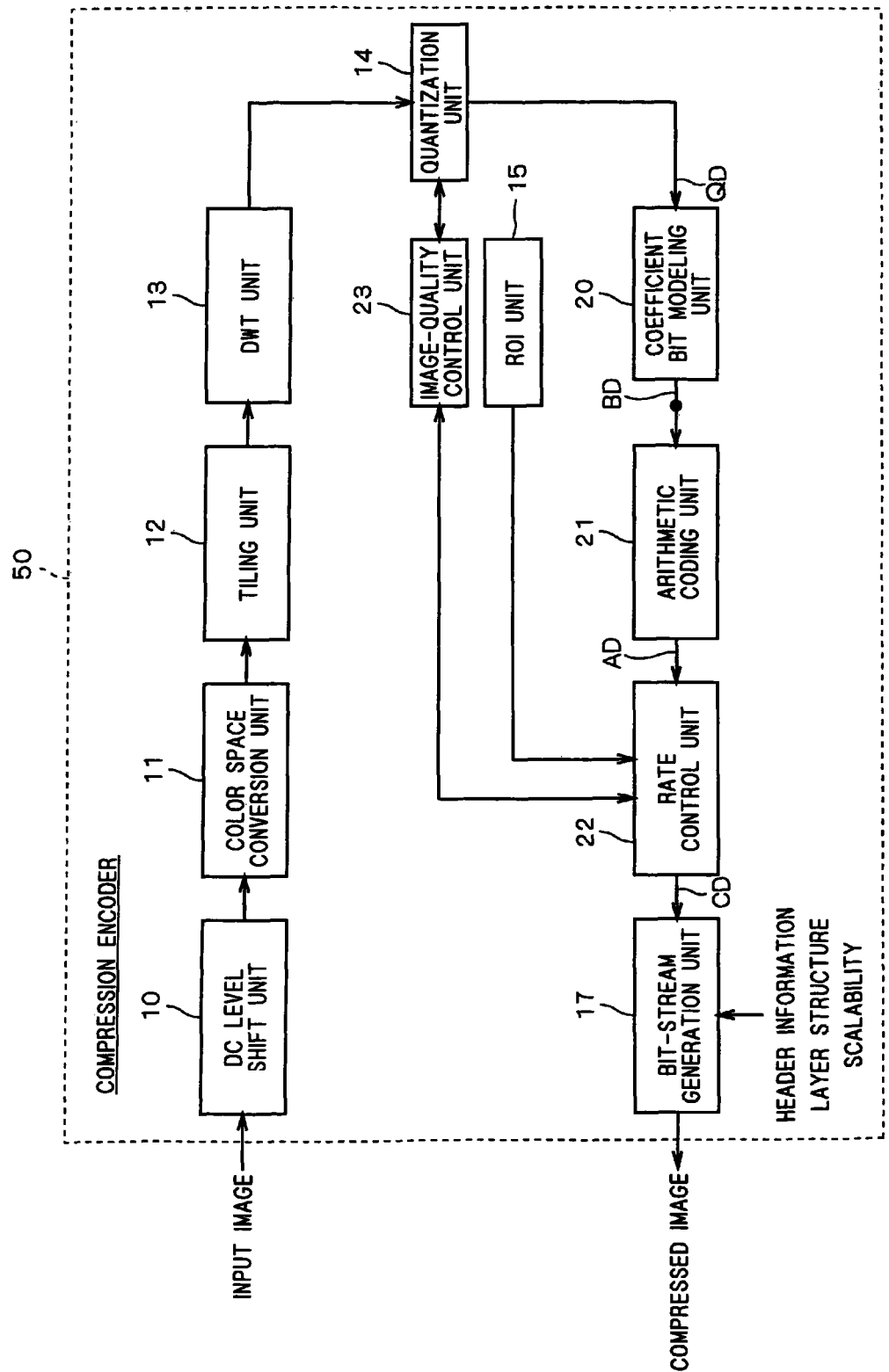
FIG. 20 shows a general configuration of a compression encoder according to a modification of the second preferred embodiment.

FIG. 20 is a block diagram showing a modification of the present embodiment, which is different from the example shown in FIG. 11 in that ROI information specified in the ROI unit 15 is inputted to the rate control unit 22, not to the quantization unit 14.

In the example shown in FIG. 11, data sorting and bit shifting based on the quantization step size $\Delta_b$ as well as data sorting and bit shifting based on ROI information are performed at the stage of quantization. In contrast, in the example shown in FIG. 20, the quantization unit 14 only performs quantization based on the quantization step size $\Delta_b$. Then, after being outputted from the quantization unit 14 and entropy coded on a block-by-block basis in the coefficient bit modeling unit 20 and the arithmetic coding unit 21, data is sorted and bit shifted with the quantization step size and sorted and bit shifted based on the ROI information when the rate control unit 22 performs rate control. The example shown in FIG. 20 is similar to that of FIG. 11 except that sorting and bit shifting on data based on the ROI information is performed in the rate control unit 22, not in the quantization unit 14, and redundant explanation is omitted here.

In the example shown in FIG. 20, sorting and bit shifting is entirely performed in the rate control unit 22. Accordingly, the present embodiment can also be implemented by a compression encoder with the quantization unit 14 not provided with the bit shifting function, only by changing the function and operation of the rate control unit 22.

Third Preferred Embodiment

In the first preferred embodiment, after quantization with the quantization step size $\Delta_b$, data is truncated so that target image quality is achieved with the noise reduction effect (beautiful skin effect) based on the rate control. The quantization step size $\Delta_b$ for use in quantization of each subband is determined by the equation (1) and the equation (2) expressed using the norm of the synthesis filter coefficient or the equation (8) expressed using the product of the value of the "energy weighting factor" discussed in the second non-patent literature and the norm of the synthesis filter coefficient.

In contrast, the present embodiment will discuss an example in the case of adapting a different "Viewing distance" according to the value of the "energy weighting factor" in the rate control after quantization with the quantization step size $\Delta_b$.

Hereinbelow, the configuration and operation of a compression encoder according to the present embodiment is described, particularly directing to differences from the first preferred embodiment.

The quantization step size $\Delta_b'$ using a different "Viewing distance" in the rate control is expressed by the following equation (14):

$$\Delta_b' = Q_P'/Q_b' \quad (14)$$

where $Q_P'$ is a positive value inputted according to the target quality information in the rate control, i.e., a quantization parameter; the higher the image quality, the smaller the input value. $Q_b'$ is a value similar to $Q_b$ in the equation (2) expressed using the norm of the synthesis filter coefficient or the equation (8) expressed using the product of the value of the "energy weighting factor" discussed in the second non-patent literature and the norm of the synthesis filter coefficient.

The relationship between the quantization step size $\Delta_b$ and $\Delta_b'$ is defined by the following equation:

$$\begin{cases} \Delta_b' = \alpha \times \Delta_b \\ \alpha = \dfrac{Q_P'}{Q_b'} \times \dfrac{Q_b}{Q_P} \end{cases} \quad (15)$$

where $\alpha$ is a weight for the quantization step size $\Delta_b'$ in the rate control by which the quantization step size $\Delta_b$ for use in quantization of each subband is multiplied.

For example, in the first preferred embodiment, let the quantization parameter $Q_P=16$ for all of the luminance signal Y and the color difference signals U and V. Then, the quantization step sizes $\Delta_b$ for the luminance signal Y and the color difference signals U and V when visual weighting optimized for a viewing distance of 3000 is applied to YUV 422 color image data are as shown in TABLEs 16 to 18. In the rate control, let the quantization parameter $Q_P'=16$ for all of the luminance signal Y and the color difference signals U and V. Then, $\alpha$ to provide the quantization step sizes $\Delta_b'$ for all of the luminance signal Y and the color difference signals U and V when visual weighting optimized for a viewing distance of 1000 is applied to YUV 422 color image data is expressed by the following equation (16):

$$\alpha = \frac{\sqrt{W_{b[i]}^{3000}}}{\sqrt{W_{b[i]}^{1000}}} \quad (16)$$

The weight $\alpha$ for the quantization step sizes $\Delta_b'$ is determined in the rate control unit 22 by the quantization step sizes $\Delta_b$ informed from the image-quality control unit 23 and target quality information inputted to the rate control unit 22.

Sorting and Bit Shifting

Similarly to the first preferred embodiment, sorting and bit shifting is performed with the quantization step size $\Delta_b'$ using a different "Viewing distance" in the rate control and the weight $\alpha$ for the quantization step size, both obtained in the above-described manner.

The rate control unit 22 shown in FIG. 1 determines the number of bits S by which bit shifting is performed using the weight $\alpha$ for the quantization step size obtained in the rate control unit 22, as expressed by the following equation (17):

$$S = \text{R O U N D} (\log_2(1/\alpha)) \quad (17)$$

where ROUND is a function for rounding decimal places, which is considered as including round-down, round-up and round-off. A positive value is shifted to the left, and a negative value is shifted to the right. Examples of the number of bits S by which bit shifting is performed in the case of rounding off with the quantization step size $\Delta_b$ optimized for a viewing distance of 3000 and the quantization step size $\Delta_b'$ optimized for a viewing distance of 1000 are shown in TABLEs 19 to 21.

TABLE 19

The number of bits S by which bit shifting is performed for luminance signal Y in YUV 422 format

| Decomposition Level | LL | HL | LH | HH |
| --- | --- | --- | --- | --- |
| 1 | X | 4 | 4 | 8 |
| 2 | X | 1 | 1 | 2 |
| 3 | X | 0 | 0 | 0 |
| 4 | X | 0 | 0 | 0 |
| 5 | 0 | 0 | 0 | 0 |

TABLE 20

The number of bits S by which bit shifting is performed for color difference signal U(Cb) in YUV 422 format

| Decomposition Level | LL | HL | LH | HH |
| --- | --- | --- | --- | --- |
| 1 | X | 2 | 3 | 4 |
| 2 | X | 1 | 2 | 2 |
| 3 | X | 1 | 1 | 1 |
| 4 | X | 0 | 0 | 1 |

TABLE 21

The number of bits S by which bit shifting is performed for color difference signal V(Cr) in YUV 422 format

| Decomposition Level | LL | HL | LH | HH |
| --- | --- | --- | --- | --- |
| 1 | X | 2 | 2 | 3 |
| 2 | X | 1 | 1 | 2 |

TABLE 21-continued

The number of bits S by which bit shifting is performed for color difference signal V(Cr) in YUV 422 format

| Decomposition Level | LL | HL | LH | HH |
|---|---|---|---|---|
| 3 | X | 1 | 1 | 1 |
| 4 | 0 | 0 | 0 | 0 |

Next, each code sequence is sorted in ascending order of quantization step size $\Delta_b{'}$ obtained in the rate control unit 22, similarly to the first preferred embodiment. The quantization step sizes $\Delta_b{'}$ corresponding to the number of bits S shown in TABLEs 19 to 21 by which bit shifting is performed are shown in TABLEs 22 to 24. The quantization step size $\Delta_b{'}$ is used only for sorting.

TABLE 22

Quantization step sizes $\Delta_b{'}$ for luminance signal Y in YUV 422 format (Viewing distance 1000)

| Decomposition Level | LL | HL | LH | HH |
|---|---|---|---|---|
| 1 | X | 20.91805 | 20.91805 | 53.67064 |
| 2 | X | 8.02608 | 8.026608 | 16.59951 |
| 3 | X | 3.82467 | 3.82467 | 7.695062 |
| 4 | X | 1.874828 | 1.874828 | 3.720513 |
| 5 | 0.47163 | 0.932036 | 0.932036 | 1.841891 |

TABLE 23

Quantization step sizes $\Delta_b{'}$ for luminance signal U(Cb) in YUV 422 format (Viewing distance 1000)

| Decomposition Level | LL | HL | LH | HH |
|---|---|---|---|---|
| 1 | X | 30.53803 | 39.95635 | 120.259 |
| 2 | X | 9.24561 | 11.30526 | 27.82707 |
| 3 | X | 3.532299 | 3.932991 | 8.694491 |
| 4 | 0.667514 | 1.536767 | 1.622516 | 3.397264 |

TABLE 24

Quantization step sizes $\Delta_b{'}$ for luminance signal V(Cr) in YUV 422 format (Viewing distance 1000)

| Decomposition Level | LL | HL | LH | HH |
|---|---|---|---|---|
| 1 | X | 23.87882 | 28.5637 | 77.82622 |
| 2 | X | 8.091745 | 9.439647 | 22.04721 |
| 3 | X | 3.288914 | 3.572391 | 7.681578 |
| 4 | 0.667514 | 1.479478 | 1.541748 | 3.181265 |

In the present embodiment, the image-quality control unit 23 obtains the quantization step size $\Delta_b$ in this way and gives it to the quantization unit 14. Then, the quantization unit 14 performs quantization with the given quantization step size $\Delta_b$ for each subband. At this time, if the quantization step size $\Delta_b$ is less than 1, it is multiplied by powers of 2 to obtain a value of 1 or more before quantization, as previously described.

An actual amount of shift is a total of the aforementioned amount of shift and the amount of shift expressed by the equation (17).

Rate Control

Figure 21:
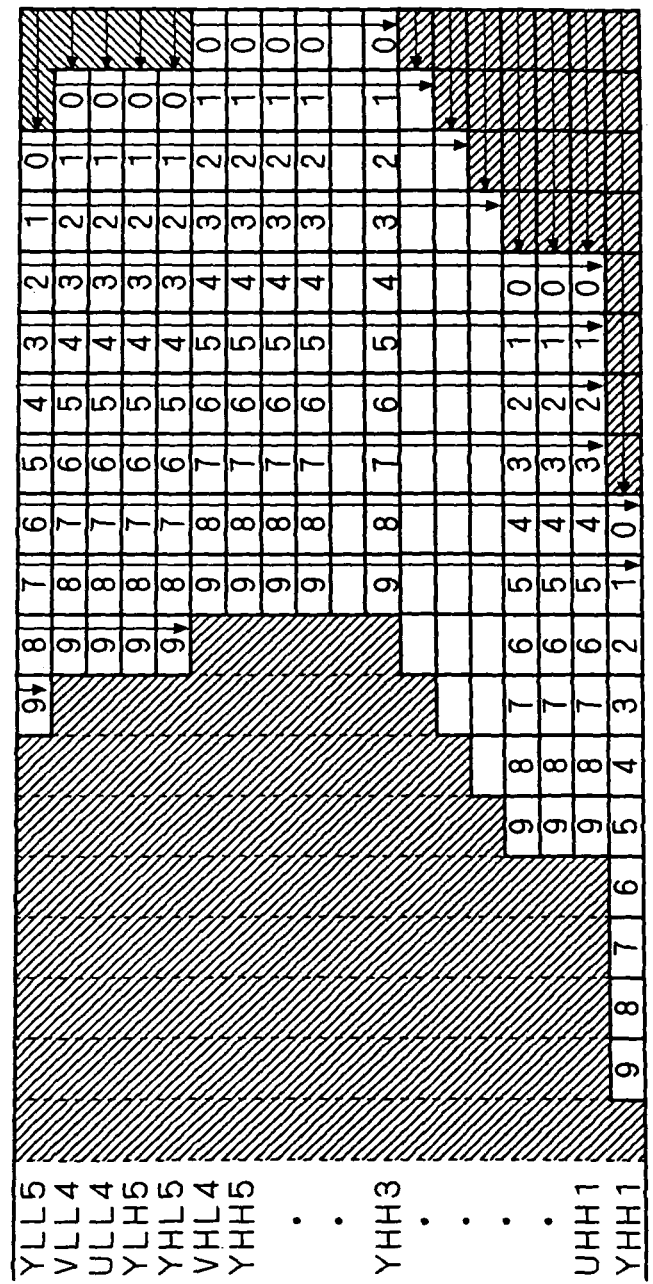
FIG. 21 shows sorting and bit shifting of a code sequence according to a third preferred embodiment of the invention.

Next, the operation performed by the rate control unit 22 shown in FIG. 1 is described. Only difference from the first preferred embodiment is the shift by the number of bits S determined based on the weight α for the quantization step size, as shown in FIG. 21. As shown in FIG. 21, bit data in the subband YHH1 is shifted to the left by 8 bits, and bit data in the subband UHH1 is shifted to the left by 4 bits.

As a result, the "Viewing distance" in the rate control unit 22 can freely be changed, which allows precise control of an image coded by a quantized value for compression so that target image quality is achieved with the noise reduction effect (beautiful skin effect).

Similarly to the first preferred embodiment, sorting and bit shifting may be both executed by the rate control unit 22. In this case, the present embodiment can also be implemented by a compression encoder with the quantization unit 14 not provided with the bit shifting function, only by changing the function and operation of the rate control unit 22.

Fourth Preferred Embodiment

In the second preferred embodiment, after quantization with the quantization step size $\Delta_b$, each ROI is assigned priority and bit shifting is performed, to thereby truncate data so that target image quality is achieved with the noise reduction effect (beautiful skin effect) by the rate control.

In contrast, the present embodiment will describe an example of adapting a different "Viewing distance" to each ROI depending on the value of "energy weighting factor" in the rate control after quantization with the quantization step size $\Delta_b$, similarly to the third preferred embodiment.

The configuration and operation of the compression encoder according to this preferred embodiment will be described below mainly with respect to differences from the first to third preferred embodiments. The compression encoder, quantization unit and ROI setting are similar to those of the second preferred embodiment.

Sorting and Bit Shifting

The quantization unit 14 shown in FIG. 11 or the rate control unit 22 shown in FIG. 20 sorts and bit shifts quantized data or coded data AD, respectively, with the quantization step size given by the image-quality control unit 23. At this time, the transform coefficients quantized with the quantization step size which has been converted into a value of 1 or more are shifted to the left by the number of bits corresponding to the exponent of the powers of 2 used for multiplication to convert the quantization step size.

Figure 22:
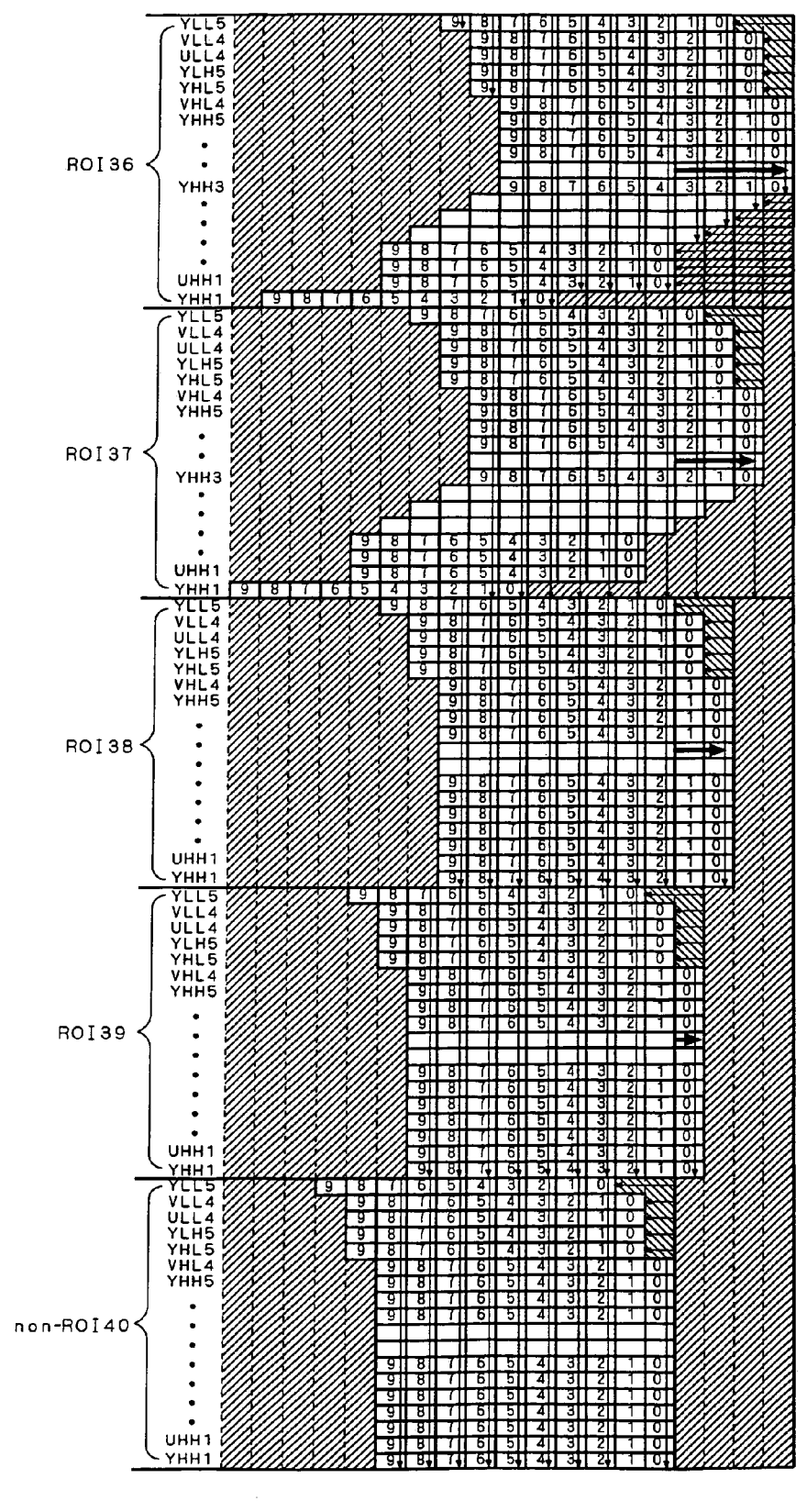

For example, similarly to the third preferred embodiment, let the quantization parameter $Q_P$=16. Then, visual weighting optimized for a viewing distance of 3000 and quantization is applied to YUV 422 color image data. Further, let the quantization parameter $Q_P{'}$=16 in the rate control. Then, sorting and bit shifting is applied to the YUV 422 color image data with the visually weighted quantization step size optimized for a viewing distance of 1000. The code sequence as shown in FIG. 22 is thereby obtained.

Next, the quantization unit 14 shown in FIG. 11 or the rate control unit 22 shown in FIG. 20 further sorts and bit shifts the code sequence shown in FIG. 10 based on the ROI information given by the ROI unit 15. Truncating ROI data in a greater amount than non-ROI data, the noise reduction effect (beautiful skin effect) on ROIs achieved by the coding processing can be expected.

The quantization unit 14 shown in FIG. 11 or the rate control unit 22 shown in FIG. 20 first divides the code sequence having been sorted and bit shifted with the quantization step size $\Delta_b{'}$ as previously described, into ROI data and non-ROI data based on the ROI information given by the ROI unit 15.

As understood from the comparison between FIGS. 5 and 18, data in each subband shown in FIG. 10 actually contains all of data on the four expanded mask regions 36a to 39a and the expanded non-mask region 40a shown in FIG. 18.

The quantization unit 14 shown in FIG. 11 or the rate control unit 22 shown in FIG. 20 divides the code sequence shown in FIG. 10 into data on the four ROIs 36 to 39 and data on the non-ROI 40 as shown in FIG. 19 based on the ROI information given by the ROI unit 15.

In order to use the quantization step size $\Delta_b'$ adapting a different "Viewing distance" in the rate control for each ROI, the number of bits S by which bit shifting is performed using the weight $\alpha$ for the quantization step size expressed by the equation (17) is applied to each ROI, as applied in the third preferred embodiment.

In FIG. 19, data is only bit shifted as a whole assigning priority to each ROI. Similarly to FIG. 21, the "Viewing distance" applied to the quantization step size $\Delta_b$ can be changed for each ROI depending on the value of the "energy weighting factor" in the rate control.

In FIG. 22, rate control is performed adapting a Viewing distance of 1000 to the ROIs 36 and 37, and a viewing distance of 3000 to the ROIs 38, 39 and the non-ROI 40.

Rate Control

The rate control unit 22 truncates data of the code sequence shifted as shown in FIG. 22 so that target image quality with the noise reduction effect (beautiful skin effect) is achieved. The data truncation occurs in sequence from the rightmost bit. For example, data is truncated from data of bit 0 in the subband VHL4 in the code sequence for the ROI 36 shown in FIG. 22 downwardly in sequence through data of bit 0 in the subband YHH5, and so on. If the target image quality is achieved by truncation of up to bit data in the subband YHH3, data in those subbands will be truncated. If the target image quality is not achieved by truncation of up to data in the subband YHH3, then, data will be truncated from data of bit 0 in the subband VLL4 in the code sequence for the ROI 36 downwardly in sequence through data of bit 0 in the subband ULL4, and so on. The data truncation is continued in sequence from data of the rightmost bit until the target image quality is achieved.

According to the fourth preferred embodiment, the "Viewing distance" can freely be changed in the quantization unit 14 shown in FIG. 11 or the rate control unit 22 shown in FIG. 20, similarly to the third preferred embodiment. This allows precise control of an image coded with a quantized value for compression so that the target image quality with the noise reduction effect (beautiful skin effect) is achieved.

Similarly to the second preferred embodiment, sorting and bit shifting may be both executed by the rate control unit 22. In this case, the present embodiment can also be implemented by a compression encoder with the quantization unit 14 not provided with the bit shifting function, only by changing the function and operation of the rate control unit 22.

While the invention has been shown and described in detail, the foregoing description is in all aspects illustrative and not restrictive. It is therefore understood that numerous modifications and variations can be devised without departing from the scope of the invention.

What is claimed is:

1. A compression encoder for compression and coding of an image signal, comprising:
   a wavelet transformer configured to recursively divide an image signal into high- and low-pass components by wavelet transform and to generate and output transform coefficients in a plurality of bandpass components;
   an image-quality controller configured to determine a quantization step size by dividing a quantization parameter, which indicates a target image quality and is set by user input, by a norm of a filter coefficient;
   an entropy coder configured to entropy code said transform coefficients; and
   a rate controller configured to perform rate control by sorting coded data outputted from said entropy coder in predetermined order of scanning with said quantization step size to generate a code sequence and to perform truncation of part of said code sequence from lowest-order bits based on a desired level of noise reduction until a total capacity of said coded data in said code sequence meets the target image quality set by the user input, an amount of truncation becoming greater as said desired level of noise reduction becomes greater.

2. A compression encoder for compression and coding of an image signal, comprising:
   a wavelet transformer configured to recursively divide an image signal into high- and low-pass components by wavelet transform and to generate and output transform coefficients in a plurality of bandpass components;
   an image-quality controller configured to determine a quantization step size by dividing a quantization parameter, which indicates a target image quality and is set by user input, by a norm of a filter coefficient;
   a region-of-interest setting unit configured to set at least one region of interest in said image signal;
   a quantizer configured to quantize and sort said transform coefficients with said quantization step size and to sort and bit shift said transform coefficients on the basis of information on setting said at least one region of interest, an amount of bit shift becoming greater as a priority of said information becomes higher;
   an entropy coder configured to entropy code said transform coefficients inputted from said quantizer; and
   a rate controller configured to perform rate control by truncating part of coded data outputted from said entropy coder from lower-order bits based on a desired level of noise reduction until a total capacity of said coded data meets the target image quality set by the user input.

3. A compression encoder for compression and coding of an image signal, comprising:
   a wavelet transformer configured to recursively divide said image signal into high-and low-pass components by wavelet transform and to generate and output transform coefficients in a plurality of bandpass components;
   a region-of-interest setting unit configured to set at least one region of interest in said image signal;
   a quantizer configured to quantize said transform coefficients;
   an entropy coder configured to entropy code said transform coefficients inputted from said quantizer; and
   a rate controller configured to perform rate control by sorting and bit shifting coded data outputted from said entropy coder on the basis of information on setting said at least one region of interest, an amount of bit shift becoming greater as a priority of said information becomes higher, to generate a code sequence and to perform truncation of part of said code sequence from lower-order bits based on a desired level of noise reduction until a total capacity of said coded data meets a target image quality set by user input.

4. The compression encoder according to claim 3, further comprising:
   an image-quality controller configured to determine a quantization step size by dividing a quantization parameter, which indicates the target image quality, by a norm of a filter coefficient, wherein said quantizer quantizes said transform coefficients with said quantization step size, and said rate controller sorts said coded data with said quantization step size.

5. The compression encoder according to any one of claims 2 to 4, wherein
said at least one region of interest includes a plurality of regions of interest,
said region-of-interest setting unit assigns a priority to each of said plurality of regions of interest, and
the amount of shift in said bit shifting on the basis of said information on setting said plurality of regions of interest is determined by said priority.

6. The compression encoder according to any one of claims 1 to 4, wherein said rate controller determines a target to be truncated in said rate control on a bit-plane-by-bit-plane basis.

7. The compression encoder according to any one of claims 1 to 4, wherein said rate controller determines a target to be truncated in said rate control on a pass-by-pass basis.

8. The compression encoder according to any one of claims 1, 2 and 4, wherein
said image-quality controller determines said quantization step size applying weighting in consideration of human visual characteristics by dividing said quantization parameter by a value obtained by multiplying a norm of a filter coefficient by an energy weighting factor which is a predetermined value determined based on the human visual characteristics.

9. The compression encoder according to any one of claims 1, 2 and 4, wherein
said image-quality controller, when said quantization step size is less than a predetermined value, multiplies said quantization step size by powers of 2 so that said quantization step size is not less than said predetermined value.

10. The compression encoder according to claim 9, wherein said rate controller, when said quantization step size is a value obtained by multiplication by powers of 2 in said image-quality controller, bit shifts said transform coefficients of said coded data, by the number of bits corresponding to an exponent of said powers of 2 in performing sorting with said quantization step size.

11. The compression encoder according to claim 1, wherein
said rate controller is capable of changing a viewing distance, and
said code sequence is bit shifted in accordance with change in viewing distance.

12. The compression encoder according to claim 2, wherein
said quantizer is configured to change a viewing distance, and
said transform coefficients are further bit shifted in accordance with a change in the viewing distance.

13. The compression encoder according to claim 3, wherein
said rate controller is configured to change a viewing distance, and
said code sequence is further bit shifted in accordance with a change in the viewing distance.

14. The compression encoder of claim 1, wherein the image-quality controller is configured to determine the quantization step size using the quantization parameter, which indicates the target image quality and is set by direct input of a numerical value by a user.

15. A compression encoder for compression and coding of an image signal, comprising:

a wavelet transformer configured to recursively divide an image signal into high- and low-pass components by wavelet transform and to generate and output transform coefficients in a plurality of bandpass components;
an image-quality controller configured to determine a quantization step size by dividing a quantization parameter, which indicates a target image quality and is set by user input, by a norm of a filter coefficient;
a region-of-interest setting unit configured to set a plurality of regions of interest in said image signal and assign a priority to each of said plurality of regions of interest;
an entropy coder configured to entropy code said transform coefficients; and
a rate controller configured to perform rate control by sorting coded data outputted from said entropy coder on the basis of the priority assigned to each of said plurality of regions of interest to generate a code sequence and to perform truncation of part of said code sequence based on a desired level of noise reduction until a total capacity of said coded data in said code sequence meets the target image quality set by the user input.

16. A compression encoder for compression and coding of an image signal, comprising:
a wavelet transformer configured to recursively divide an image signal into high- and low-pass components by wavelet transform and to generate and output transform coefficients in a plurality of bandpass components;
an image-quality controller configured to determine a quantization step size by dividing a quantization parameter, which indicates a target image quality and is set by user input, by a norm of a filter coefficient;
a region-of-interest setting unit configured to set a plurality of regions of interest in said image signal and assign a priority to each of said plurality of regions of interest;
a quantizer configured to quantize and sort said transform coefficients with said quantization step size and to sort and bit shift said transform coefficients on the basis of the priority assigned to each of said plurality of regions of interest;
an entropy coder configured to entropy code said transform coefficients inputted from said quantizer; and
a rate controller configured to perform rate control by truncating part of coded data outputted from said entropy coder based on a desired level of noise reduction until a total capacity of said coded data meets the target image quality set by the user input.

17. A compression encoder for compression and coding of an image signal, comprising:
a wavelet transformer configured to recursively divide said image signal into high-and low-pass components by wavelet transform and to generate and output transform coefficients in a plurality of bandpass components;
a region-of-interest setting unit configured to set a plurality of regions of interest in said image signal and assign a priority to each of said plurality of regions of interest;
a quantizer configured to quantize said transform coefficients;
an entropy coder configured to entropy code said transform coefficients inputted from said quantizer; and
a rate controller configured to perform rate control by sorting and bit shifting coded data outputted from said entropy coder on the basis of the priority assigned to each of said plurality of regions of interest to generate a code sequence and to perform truncation of part of said code sequence based on a desired level of noise reduction until a total capacity of said coded data meets a target image quality set by user input.

* * * * *